(12) United States Patent
Muramoto

(10) Patent No.: US 10,212,205 B2
(45) Date of Patent: *Feb. 19, 2019

(54) RECEPTION TERMINAL

(71) Applicant: Panasonic Intellectual Property Management Co., Ltd., Osaka (JP)

(72) Inventor: Eiichi Muramoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,004

(22) Filed: Jul. 21, 2017

(65) Prior Publication Data

US 2017/0324798 A1    Nov. 9, 2017

Related U.S. Application Data

(63) Continuation of application No. 14/435,410, filed as application No. PCT/JP2013/005880 on Oct. 2, 2013, now Pat. No. 9,749,384.

(30) Foreign Application Priority Data

Oct. 24, 2012    (JP) ................... 2012-234682

(51) Int. Cl.
*G06F 15/16* (2006.01)
*H04L 29/06* (2006.01)
(Continued)

(52) U.S. Cl.
CPC ............ *H04L 65/608* (2013.01); *H04L 65/80* (2013.01); *H04N 21/2187* (2013.01); *H04N 21/44209* (2013.01); *H04N 21/4622* (2013.01)

(58) Field of Classification Search
CPC ... H04L 65/608; H04L 65/80; H04N 21/2187; H04N 21/44209; H04N 21/4622
(Continued)

(56) References Cited

U.S. PATENT DOCUMENTS 8,155,063 B2 * 4/2012 Choi ................. H04W 72/0453
                                                        370/329
8,165,118 B2   4/2012 Stewart et al.
(Continued)

FOREIGN PATENT DOCUMENTS

JP    2002-077263 A    3/2002
JP    2004-516693 A    6/2004
(Continued)

OTHER PUBLICATIONS

Casner, "Session Description Protocol (SDP) Bandwidth Modifiers for RTP Control Protocol (RTCP) Bandwidth," Standards Track, RFC 3556, Jul. 2003, 8 pages.
(Continued)

*Primary Examiner* — Melvin H Pollack
(74) *Attorney, Agent, or Firm* — Seed IP Law Group LLP

(57) ABSTRACT

A reception terminal is provided in a communication system including a transmission terminal that transmits packets in a real-time stream and a transfer terminal that caches and transfers packets transmitted from the transmission terminal. The reception terminal includes a receiver which receives packets, and circuitry which obtains a first available band between the reception terminal and the transfer terminal and a second available band between the reception terminal and the transmission terminal. The reception terminal includes a transmitter which transmits requests to the transfer terminal at a frequency that is based on the first available band, wherein the frequency defines how often the requests are transmitted and the requests trigger transmission of packets
(Continued)

from the transfer terminal to the reception terminal in the first available band. The transmitter notifies the transmission terminal of the second available band to trigger transmission of packets from the transmission terminal in the second available band.

10 Claims, 14 Drawing Sheets

(51) Int. Cl.
*H04N 21/2187* (2011.01)
*H04N 21/442* (2011.01)
*H04N 21/462* (2011.01)

(58) Field of Classification Search
USPC .......................................................... 709/219
See application file for complete search history.

(56) References Cited

U.S. PATENT DOCUMENTS

| | | | |
|---|---|---|---|
| 8,199,653 B2* | 6/2012 | Bugenhagen | H04L 41/08 370/236.2 |
| 8,386,622 B2 | 2/2013 | Jacobson | |
| 8,576,858 B2* | 11/2013 | Kimmich | H04N 21/631 370/401 |
| 8,589,996 B2 | 11/2013 | Ma et al. | |
| 8,694,675 B2* | 4/2014 | Wang | H04L 67/327 709/206 |
| 8,762,570 B2 | 6/2014 | Qian et al. | |
| 8,830,863 B2* | 9/2014 | Novak | H04W 36/06 370/252 |
| 8,837,511 B2* | 9/2014 | Ravindran | H04W 76/002 370/432 |
| 8,923,293 B2 | 12/2014 | Jacobson et al. | |
| 8,924,460 B2* | 12/2014 | Collet | H04L 67/104 709/202 |
| 9,015,468 B2 | 4/2015 | Wang et al. | |
| 9,049,251 B2 | 6/2015 | Ravindran et al. | |
| 9,078,176 B2* | 7/2015 | Song | H04W 36/0055 |
| 9,191,459 B2* | 11/2015 | Ravindran | H04L 67/327 |
| 9,253,087 B2 | 2/2016 | Zhang et al. | |
| 9,319,311 B2* | 4/2016 | Wang | H04L 45/306 |
| 9,379,970 B2* | 6/2016 | Wang | H04L 63/0272 |
| 9,386,327 B2 | 7/2016 | La Joie et al. | |
| 9,686,194 B2* | 6/2017 | Jacobson | H04L 45/745 |
| 9,749,384 B2* | 8/2017 | Muramoto | H04N 21/2187 |
| 9,787,652 B2* | 10/2017 | Wang | H04N 21/6334 |
| 9,832,246 B2* | 11/2017 | LaJoie | H04L 65/601 |
| 9,912,983 B2* | 3/2018 | Wang | H04N 21/43615 |
| 9,913,130 B2* | 3/2018 | Brisebois | H04W 8/245 |
| 2001/0044835 A1 | 11/2001 | Schober et al. | |
| 2004/0264368 A1 | 12/2004 | Heiskari et al. | |
| 2005/0005020 A1 | 1/2005 | Rey et al. | |
| 2007/0213038 A1* | 9/2007 | Masseroni | H04L 29/06027 455/414.3 |
| 2009/0285209 A1 | 11/2009 | Stewart et al. | |
| 2010/0119059 A1* | 5/2010 | Kojima | H04L 45/00 380/42 |
| 2010/0220687 A1* | 9/2010 | Reznik | H04W 36/005 370/331 |
| 2011/0070885 A1* | 3/2011 | Ruuska | H04W 16/14 455/434 |
| 2012/0079549 A1 | 3/2012 | Dekker | |
| 2012/0087380 A1 | 4/2012 | Tang et al. | |
| 2012/0203903 A1* | 8/2012 | Nogami | H04N 7/17318 709/224 |
| 2013/0185406 A1* | 7/2013 | Choi | H04L 67/2847 709/223 |
| 2014/0006565 A1 | 1/2014 | Muscariello et al. | |
| 2014/0310527 A1 | 10/2014 | Veugen et al. | |
| 2015/0319486 A1* | 11/2015 | Wang | H04N 21/2343 725/62 |
| 2017/0054482 A1* | 2/2017 | Forenza | H04B 7/0456 |
| 2017/0339217 A1* | 11/2017 | Morrill | H04L 67/18 |

FOREIGN PATENT DOCUMENTS

| | | |
|---|---|---|
| JP | 2004-343698 A | 12/2004 |
| WO | 2010/138041 A1 | 12/2010 |

OTHER PUBLICATIONS

Handley, et al, "TCP Friendly Rate Control (TFRC): Protocol Specification," RFC:3448, Standards Track, 24 pages.
International Search Report, dated Jan. 7, 2014, for corresponding International Application No. PCT/JP2013/005880, 4 pages.
Jacobson, et al. "Networking Named Content," Italy, CoNEXT 2009, Dec. 2009, 13 pages.
Jacobson, et al. "VoCCN: Voice-over Content-Centric Networks," ReArch '09, Italy, Dec. 1, 2009, 6 pages.
Koponen et al., "A Data-Oriented (and Beyond) Network Architecture," Proceeding of the 2007 Conference on Applications, Technologies, Architecture and Protocols for Computer Communications (ACM SIGCOMM Computer Communications Review), 37(4), Oct. 2007, 12 pages.
Lazzaro, "Framing Real-time Transport Protocol (RTP) and RTP Control Protocol (RTCP) Packets over Connection-Oriented Transport," Standards Track, RFC 4571, Jul. 2006, 9 pages.
Schulzrinne et al., "RTP: A Transport Protocol for Real-Time Applications," Standards Track, RFC 3550, Jul. 2003, 89 pages.

\* cited by examiner

RECEPTION TERMINAL

BACKGROUND

Technical Field

The present invention relates to a communication system that transmits a real-time streaming packet, and also to a reception terminal, a transmission terminal and a flow rate control method which are used in the communication system.

Description of the Related Art

A technique called CCN (content centric network), which is disclosed in Non-Patent Literature (hereinafter, referred to as "NPL") 1, has attracted attention in recent years. CCN is a content distribution platform to manage a content based on the name of the content.

In CCN, the contents to be distributed, or data pieces obtained by splitting a content to be distributed are named in advance. A reception terminal to acquire a content issues a packet called "interest packet." The "interest packet" requests transmission of a content by specifying the name of the content (hereinafter, referred to as "content name").

Upon reception of an interest packet, a terminal that has published a content (transmission terminal) transmits a content corresponding to the content name specified by the interest packet to the reception terminal. In this way, each reception terminal can acquire the content based on the content name without knowing where the content is.

CCN has an advantage that a content can be acquired from a router that has transferred the content in the past. In CCN, each router caches (temporarily stores) contents to be transferred from a transmission terminal to a reception terminal. If a content specified by a received interest packet is included in the cached contents, the router transmits the content to the reception terminal. In this way, in CCN, contents can be transmitted to the reception terminal without retransmission of the content from the transmission terminal to the router.

For example, NPL 1, Patent Literature (hereinafter, referred to as "PTL") 1 and NPL 3 disclose a flow rate control (flow control) method in CCN.

In flow rate control disclosed in NPL 1, an interest packet is issued for each small part resulting from division of a content, at the same timing as returning of ACK (acknowledgement) from TCP (transmission control protocol).

In such flow rate control, a reception terminal can acquire a content at the same timing as returning of ACK of TCP.

PTL 1 and NPL 3 disclose a flow rate control in Voice Over CCN, which achieves VOIP (Voice Over IP) on CCN. In Voice Over CCN, each terminal transmits call control information by using an interest packet in CCN. Each terminal performs call negotiation to prepare to transmit or receive an RTP (real-time transport protocol) packet for voice. The reception terminal regularly issues an interest packet for voice data. The transmission terminal sequentially transmits to the reception terminal a packet storing small pieces of divided voice data, each time the transmission terminal receives an interest packet. A packet storing pieces of divided voice data is hereinafter referred to as "data packet."

In such a flow rate control, the reception terminal can acquire a real-time stream of voice at a fixed rate. As described above, the router in CCN caches a real-time stream. Another reception terminal that is different from the reception terminal which is the first to start receiving a data packet (hereinafter, referred to as "other reception terminal") issues an interest packet for the data packet. This allows the other reception terminal to acquire a data packet not from the transmission terminal but from the router.

In this way, by using the flow rate control disclosed in NPL 1 and the flow rate control disclosed in PTL 1 and NPL 3, CCN can distribute contents efficiently. Thus, CCN using such flow rate control is particularly suitable for distributing a real-time stream.

Transmission and reception of a real-time stream of, e.g., a video file or a voice file has been actively performed and popular in the Internet in recent years. Accordingly, CCN is expected to be applied to the Internet in transmission in a real-time stream of, e.g., a video file or a voice file.

However, the Internet is a best effort network in which Quality of Service (QoS) fails to be guaranteed and traffic is in conflict with each other. Thus, a band available for each transmission terminal varies in the Internet.

In transmission of a real-time stream using such a network, it is required to control a flow rate of real-time streaming packets to be transmitted to the network to prevent a packet loss. To control the flow rate of real-time streaming packets, a method for estimating a band available for data transmission (hereinafter, referred to as "available band") is used. In such a flow rate control, a method for controlling a code amount of an encoder for a real-time stream so as to transmit a packet by using the estimated available band is used.

For example, NPL 2 discloses an example of the method for estimating a band for an adaptive flow rate control in a best effort network.

In TFRC (TCP friendly rate control) disclosed in NPL 2, a round trip time RTT and a loss event rate p between a transmission terminal and a reception terminal are measured. In TFRC, the measured round trip time RTT and loss event rate p are substituted in Equation 1 below so that an estimation value of an available band [bps] Xcal is calculated. In Equation 1, "s" represents a packet size [byte], "R" is a representative value [second] of the round trip time RTT, and t_RTO is a retransmission timeout. The retransmission timeout t_RTO is 4R.

[1]

$$Xcal = \frac{8s}{R\left(\sqrt{2p/3} + t\_RTO \times \sqrt{3p/8} \times p \times (1+32p^2)\right)} \quad \text{(Equation 1)}$$

In contents transmission using thus estimated available band, a flow rate control for maintaining TCP fairness is possible. That is, in a best effort network, the flow rate control disclosed in NPL 2 allows a real-time streaming distribution with TCP fairness maintained.

As described above, the flow rate control targeting CNN and proposed by PTL 1 and NPL 3 is different from one that targets a best effort network and is proposed by NPL 2. To transmit a real-time stream such as video voice data by CCN in a best effort network such as the Internet, the method for estimating a band in TFRC may be implemented on CCN and flow rate control may be performed based on an estimation value obtained by the method.

CITATION LIST

Patent Literature

PTL 1
U.S. Patent Application Publication No. 2009-0285209

Non-Patent Literature

NPL 1
V. Jacobson, D. K. Smetters, J. D. Thornton, M. F. Plass, N. H. Briggs, R. L. Braynard (PARC) "Networking Named Content," Italy, CoNEXT 2009, December, 2009.
NPL 2
M. Handley, S. Floyd, J. Padhye, J. Widmer, "TCP Friendly Rate Control (TFRC): Protocol Specification," RFC3448, January 2003
NPL 3
V. Jacobson, D. K. Smetters, N. H. Briggs, M. F. Plass, P. Stewart, J. D. Thornton, R. L. Braynard (PARC), "VoCCN: Voice Over Content-Centric Networks," ReArch '09, Italy, December, 2009.

BRIEF SUMMARY

Technical Problem

However, if TFRC, which is a flow rate control in an upper layer, is implemented in CCN which issues an interest packet at the aforementioned timing, an accurate available band in TFRC cannot be estimated.

The reason for this is interference between the flow rate control in a lower layer (protocol operation in CCN performing operation equivalent to that in TCP) and the flow rate control in the upper layer (TFRC). The interference prevents the flow rate control from being performed in accordance with design intention, resulting in deterioration of transmission performance. The conventional technique has a problem of decrease in transmission performance when CCN is applied to a best effort network to transmit a real-time streaming packet.

An object of the present invention is to prevent decrease in transmission performance when CCN is applied to a best effort network to transmit a real-time streaming packet.

Solution to Problem

A communication system disclosed herein includes a transmission terminal that transmits a packet in a real-time stream, a transfer terminal that transfers the packet, and a reception terminal that receives the packet, in which the transfer terminal includes: a cache section that caches the packet transmitted from the transmission terminal; and a transfer stack that transfers the packet cached in the cache section to the reception terminal in response to a request from the reception terminal, and the reception terminal includes: an available band estimating section that estimates a first available band that is an available band between the reception terminal and the transfer terminal, and a second available band that is an available band between the reception terminal and the transmission terminal; and an RTCP-R control section that requests the transfer terminal to transfer the packet using the estimated first available band and that notifies the transmission terminal of the estimated second available band, and the transmission terminal includes a transmission stack that transmits the packet using the second available band notified by the reception terminal.

A reception terminal disclosed herein is a reception terminal in a communication system including a transmission terminal that transmits a packet in a real-time stream, a transfer terminal that caches and transfers the packet transmitted from the transmission terminal, and a reception terminal that receives the packet transferred from the transfer terminal, the reception terminal including: an available band estimating section that estimates a first available band that is an available band between the reception terminal and the transfer terminal, and a second available band that is an available band between the reception terminal and the transmission terminal; and an RTCP-R control section that requests the transfer terminal to transfer the packet at a frequency based on the estimated first available band to cause the transfer terminal to transfer the packet using the first available band, and that notifies the transmission terminal of the estimated second available band to cause the transmission terminal to transmit the packet using the second available band.

A transmission terminal disclosed herein is a transmission terminal in a communication system including a transmission terminal that transmits a packet in a real-time stream, a transfer terminal that caches and transfers the packet transmitted from the transmission terminal, and a reception terminal that receives the packet transferred from the transfer terminal, the transmission terminal including: a transmission stack that transmits the packet storing data of the real-time stream; an RTCP-S control section that estimates a first available band that is an available band between the reception terminal and the transfer terminal and a second available band that is an available band between the reception terminal and the transmission terminal, that requests the transfer terminal to transfer the packet at a frequency based on the estimated first available band, and that receives a notification of the second available band from the reception terminal that causes the transfer terminal to transfer the packet using the first available band; and a transmission band estimating section that causes the transmission stack to transmit the packet using the second available band notified by the reception terminal.

A flow rate control method disclosed herein is a flow rate control method in a communication system including a transmission terminal that transmits a packet in a real-time stream, a transfer terminal that caches and transfers the packet transmitted from the transmission terminal, and a reception terminal that receives the packet transferred from the transfer terminal, the flow rate control method including: estimating, by the reception terminal, a first available band that is an available band between the reception terminal and the transfer terminal and a second available band that is an available band between the reception terminal and the transmission terminal; and requesting, by the reception terminal, the transfer terminal to transfer the packet at a frequency based on the estimated first available band to cause the transfer terminal to transfer the packet using the first available band, and notifying, by the reception terminal, the transmission terminal of the estimated second available band to cause the transmission terminal to transmit the packet using the second available band.

Advantageous Effects of Invention

In the disclosure herein, decrease in transmission performance can be prevented when CCN is applied to a best effort network to transmit a real-time streaming packet.

DETAILED DESCRIPTION

A description will be given of the background of the present invention prior to the description of embodiments of the present invention. More specifically, a description will be given of analysis of a cause and solution regarding the decrease in transmission performance, which is caused when a real-time streaming packet is transmitted in a best effort network using CCN.

The causes of such deterioration in performance include two phenomena.

To measure the round trip time RTT described in Background Art, the transmission terminal puts a transmission time stamp on a packet, the reception terminal returns the reception time of the packet to the transmission terminal, and the transmission terminal calculates the difference between the transmission time and the reception time. However, when a packet is transmitted in the lower layer at a timing equivalent to that in TCP, transmission of a packet may be kept waiting in a protocol stack in CCN of the lower layer. This is because the operation equivalent to control of a congestion window in TCP is performed in the lower layer.

Thus, the measurement value of the round trip time RTT increases by the waiting time in the protocol stack in CCN of the lower layer. The round trip time RTT is a term used in a denominator in Equation 1 above. Accordingly, an estimation value of an available band by TFRC in the upper layer is smaller than an actual available band (first phenomenon).

On the other hand, achieving a maximum throughput by the lower layer performing the operation equivalent to that in TCP is based on the assumption that data to be transmitted is always ready. However, if no packet to be transmitted is ready at a timing to transmit a packet in the lower layer, the protocol of the lower layer loses an opportunity of transmitting a packet. In a case where a plurality of TCP flows share a single bottleneck link, for example, and when there exists a timing at which there is no data to be transmitted in a specified flow, an opportunity to transmit a packet is lost in the specified flow.

Thus, in the aforementioned case where the estimation value of the available band in the upper layer is smaller than the actual available band (expected band in the lower layer), there is no packet to be transmitted even if transmission of a packet is desired. That is, a normally obtainable throughput (fair TCP throughput) cannot be achieved in the protocol of the lower layer (second phenomenon).

Figure 1:
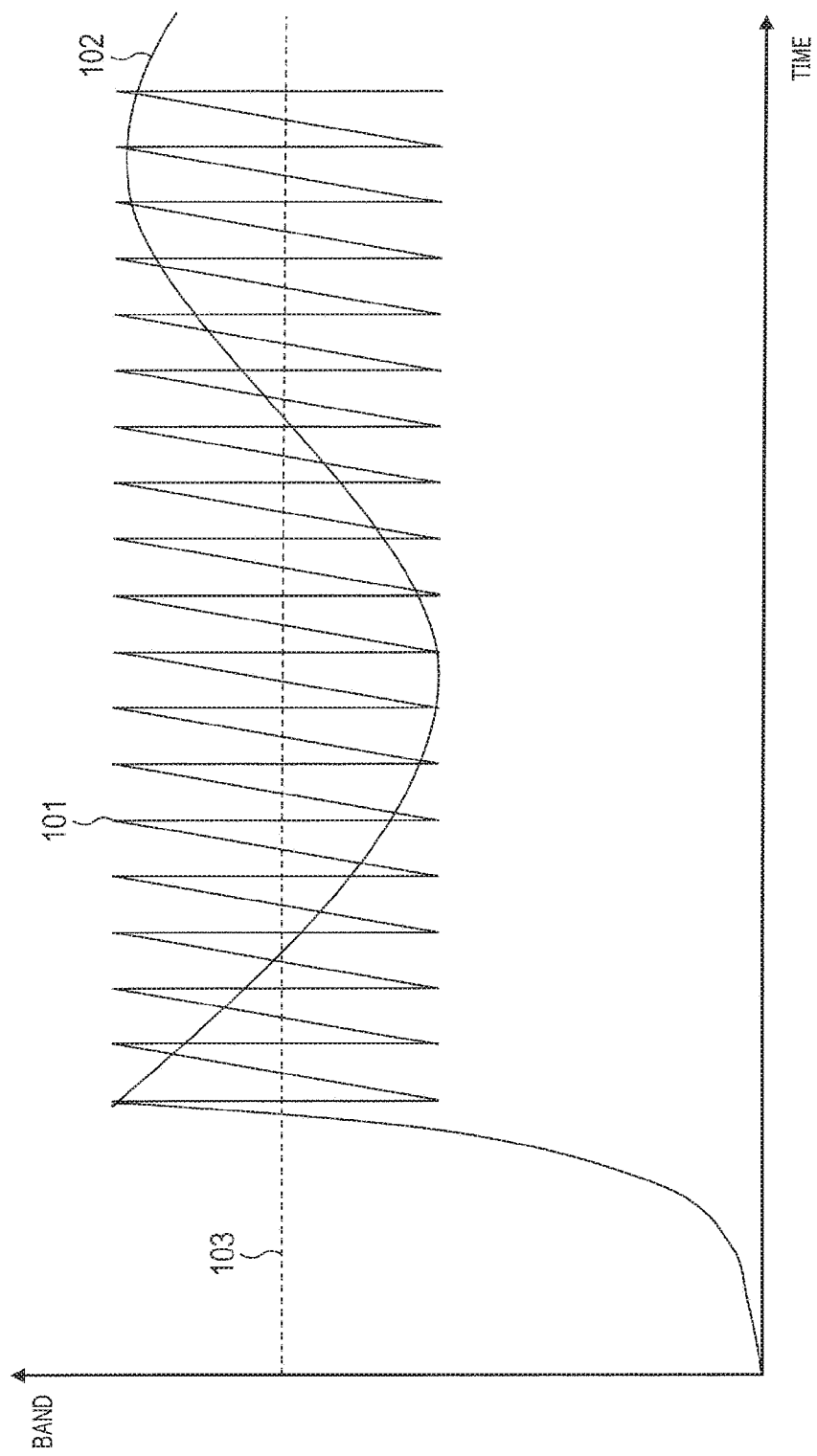
FIG. 1 illustrates throughput change with time in flow rate control in a lower layer and throughput change with time in flow rate control in an upper layer.

FIG. 1 illustrates throughput change with time when the lower layer flow rate control is performed (protocol operation in CCN performing operation equivalent to that in TCP) and throughput change with time when the upper layer flow rate control is performed (TFRC).

In a congestion avoidance mode of TCP, a transmission amount (congestion windows) is increased linearly until occurrence of loss and the transmission amount is halved after the occurrence of loss. The increase and decrease are repeated. Thus, as illustrated in FIG. 1, throughput 101 of TCP changes repeatedly in a right-triangle shape (saw-blade shape).

In TFRC, since an index load moving average is used for calculation of a loss event rate p or round trip time RTT, the calculation is affected by a previous value. Thus, as illustrated in FIG. 1, throughput 102 of TFRC repeats smooth increase and decrease. An average value of throughput 101 of TCP and an average value of throughput 102 of TFRC approximate predetermined constant value 103.

The aforementioned first phenomenon occurs in a section having throughput 101 of TCP lower than throughput 102 of TFRC. The aforementioned second phenomenon occurs in a section having throughput 102 of TFRC lower than throughput 101 of TCP.

In this way, simple combination of the flow rate control in the lower layer and the flow rate control in the upper layer causes mutual interference of the different flow rate controls, resulting in decrease in transmission performance in a real-time stream. As a result, the quality of contents such as video and voice reproduced by the reception terminal deteriorates.

In the present invention, therefore, an available band between a reception terminal and a transfer terminal that transfers a packet is estimated, and the flow rate control in a lower layer is performed based on the estimation result. In the present invention, an available band between the reception terminal and a transmission terminal that is a transmitter of a packet is estimated, and the flow rate control in an upper layer is performed based on the estimation result. Thus, the present invention prevents the flow rate control in the lower layer and the flow rate control in the upper layer from negatively affecting each other. That is, the present invention prevents decrease in transmission performance, in transmission of a real-time streaming packet when CCN is applied to a best effort network.

Hereinafter, each embodiment of the present invention will be described in detail with reference to the accompanying drawings.

Embodiment 1

Embodiment 1 of the present invention is an example of basic modes of the present invention.

More specifically, the present embodiment relates to a communication system including a transmission terminal, a transfer terminal and a reception terminal. The transmission terminal (publisher) transmits a real-time streaming packet. The transfer terminal caches and transfers a packet transmitted from the transmission terminal. The reception terminal receives a packet transferred from the transfer terminal.

Figure 2:
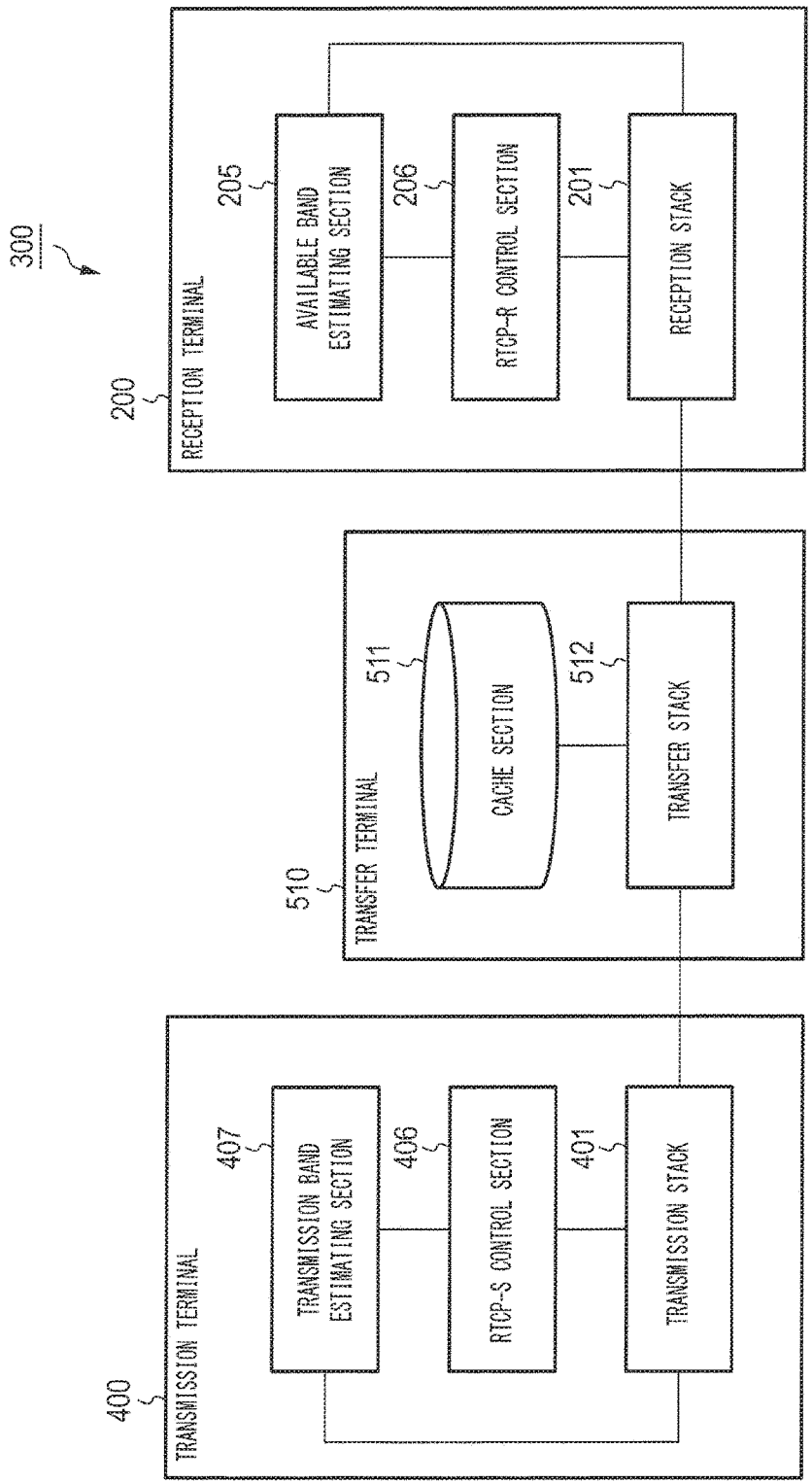
FIG. 2 is a block diagram illustrating a configuration of each apparatus in a communication system of Embodiment 1 of the present invention.

FIG. 2 is a block diagram illustrating a configuration of each apparatus in the communication system of the present embodiment.

In FIG. 2, communication system 300 includes transmission terminal 400, transfer terminal (CCN router) 510, and reception terminal 200.

Transfer terminal 510 includes cache section 511 and transfer stack 512.

Cache section 511 caches a packet transmitted from transmission terminal 400.

Transfer stack 512 transfers a packet cached in cache section 511 to reception terminal 200, in response to a request from reception terminal 200.

Reception terminal 200 includes reception stack 201, available band estimating section 205 and RTCP-R control section 206.

Reception stack 201 performs communication including reception of a packet with reception terminal 200 and transfer terminal 510.

Available band estimating section 205 estimates a first available band that is an available band between reception terminal 200 and transfer terminal 510 and a second available band that is an available band between reception terminal 200 and transmission terminal 400.

RTCP-R control section 206 requests transfer terminal 510 to transfer a packet using the estimated first available band. RTCP-R control section 206 notifies transmission terminal 400 of the estimated second available band. The notification is performed, for example, via reception stack 201 and transfer terminal 510.

Transmission terminal 400 includes transmission stack 401, RTCP-S control section 406 and transmission band estimating section 407.

Transmission stack 401 transmits a packet storing real-time streaming data.

RTCP-S control section 406 is notified of the second available band by the reception terminal.

Transmission band estimating section 407 causes transmission stack 401 to transmit a packet using the second available band notified by reception terminal 200.

Reception terminal 200, transmission terminal 400 and transfer terminal 510 each have, for example, a CPU (central processing unit), a storage medium such as a ROM (read only memory) that stores a control program, a working memory such as a RAM (random access memory) and a communication circuit or the like, which are not illustrated. Functions of the sections described above are achieved by the CPU executing the control program.

In communication system 300 according to the present embodiment, the flow rate control of transfer terminal 510 can be achieved based on the available band between reception terminal 200 and transfer terminal 510. In communication system 300 of the present embodiment, in addition to the aforementioned flow rate control, the flow rate control of transmission terminal 400 can be achieved based on an estimation value of the available band between reception terminal 200 and transmission terminal 400.

Transmission terminal 400, transfer terminal 510 and reception terminal 200 can be CCN compliant terminals, for example. In this case, the flow rate control of transfer terminal 510 corresponds to the aforementioned flow rate control in the lower layer (protocol operation in CCN performing operation equivalent to that in TCP), while the flow rate control of transmission terminal 400 corresponds to the aforementioned flow rate control in the upper layer (TFRC). Thus, the flow rate control of transfer terminal 510 based on the available band between reception terminal 200 and transfer terminal 510 can avoid the aforementioned first phenomenon. The flow rate control of transmission terminal 400 based on the estimation value of the available band between reception terminal 200 and transmission terminal 400 helps control the amount of data generated based on an estimation band in transmission terminal 400. That is, such flow rate control can avoid the aforementioned second phenomenon.

That is, reception terminal 200 of the present embodiment allows estimation of a band that causes no deterioration in performance of the flow rate control in the upper layer, even when CCN is applied to a lower layer in a best effort network such as the Internet. The flow rate control in CCN in the lower layer does not prevent the flow rate control in the upper layer. Thus, TCP fairness is guaranteed in the upper layer. Accordingly, reception terminal 200 satisfies TCP fairness and controls adaptively a flow rate of a real-time stream such as video and voice in accordance with a degree of congestion in the network so that an appropriate transmission rate can be achieved.

That is, reception terminal 200 according to the present embodiment can prevent decrease in transmission performance in transmission of a real-time streaming packet when CCN is applied to a best effort network.

A CCN-compliant router (hereinafter, referred to as "CCN router") caches a real-time stream that has been already published from the transmission terminal and accumulated. Transmission of such cached stream is influenced by an available band from the CCN router to the reception terminal but not influenced by an available band from the transmission terminal to the CCN router. Accordingly, cached streams can be received at a rate higher than an original transmission rate of the transmission terminal, and can be reproduced at a speed higher than an original reproduction speed at the reception terminal.

For example, if the frequency of issuing interest packets by another reception terminal is doubled, a speed of transmitting data packets from a cache on the router is doubled. Voice data extracted from data packets received by the other reception terminal is reproduced at a double speed while the pitches of the sound are adjusted. Thus, a user of the other reception terminal can hear the voice data till the end, with the voice data catching up later.

Thus, in Voice Over CCN, it is possible to build an application that allows a third person to join a conversation that has already started.

In the application, a transmission rate suitable to transmit a real-time stream from a transmission terminal to a CCN router may fail to coincide with a transmission rate suitable to transmit a real-time stream from the CCN router to a reception terminal. Reception terminal 200 according to the present embodiment is, therefore, suitable for such application.

Embodiment 2

Embodiment 2 of the present invention is an example of specific aspects of the present invention.

More specifically, the present embodiment relates to a CCN-compliant reception terminal in a communication system including a CCN-compliant transmission terminal, a CCN-compliant transfer terminal and the CCN-compliant reception terminal. The transmission terminal transmits (publishes) a packet of real-time streaming video data. The transfer terminal is a router that caches and transfers a packet transmitted from the transmission terminal. The reception terminal receives a packet transferred from the transfer terminal.

First, a description will be given of a configuration of the communication system according to the present embodiment.

Configuration of Communication System

Figure 3:
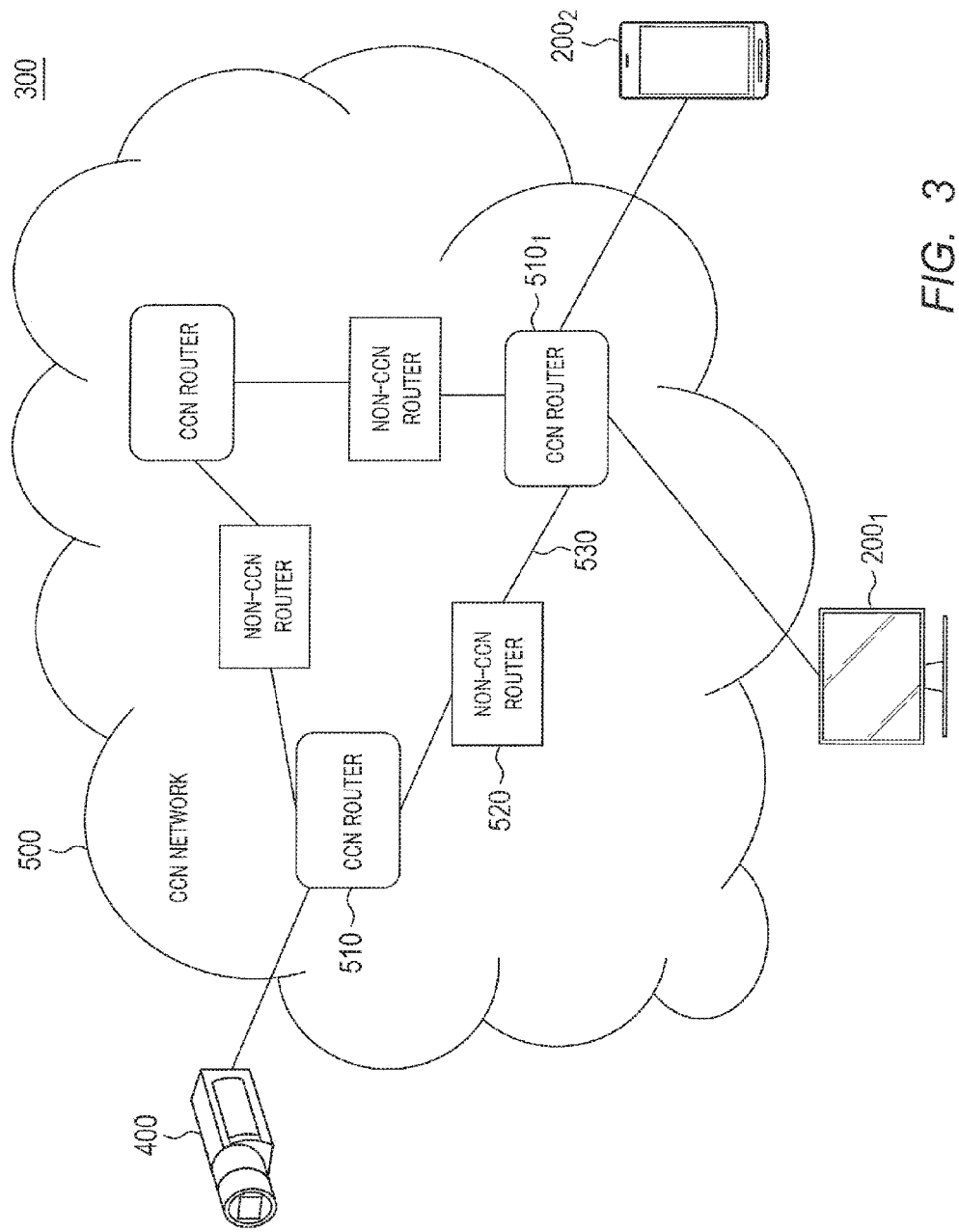
FIG. 3 is a system configuration diagram illustrating a configuration example of a communication system according to Embodiment 2 of the present invention.

FIG. 3 is a system configuration diagram illustrating a configuration example of a communication system according to the present embodiment.

In FIG. 3, communication system 300 includes transmission terminal 400, first reception terminal $200_1$, and second reception terminal $200_2$. The terminals are connected to CCN network 500.

CCN network 500 includes multiple CCN-compliant transfer terminals (hereinafter, referred to as "CCN router") 510 and multiple CCN-incompliant transfer terminals (hereinafter, referred to as "non-CCN router") 520. CCN network 500 includes multiple network lines 530 that connect the transfer terminals.

First reception terminal $200_1$ and second reception terminal $200_2$ are connected to an identical CCN router, i.e., first CCN router $510_1$. The route from transmission terminal 400 to first reception terminal $200_1$ and the route from transmission terminal 400 to second reception terminal $200_2$ share the route to first CCN router $510_1$, and branches at first CCN router $510_1$.

CCN network 500, which is a CCN network, is a best effort network in which, in addition to the illustrated terminals, not-illustrated multiple terminals are connected and the multiple terminals share bands of network lines 530.

As in the existing Internet, most competing traffic in CCN network 500 is so-called TCP traffic such as HTTP (hypertext transfer protocol) or FTP (file transfer protocol). That is, in CCN network 500, TCP fairness is required.

First reception terminal $200_1$ and second reception terminal $200_2$ have the same configuration, so that they are collectively described as "reception terminal 200" as appropriate. The respective configurations of transmission terminal 400, reception terminal 200 and CCN router 510 will be described later. Non-CCN router 520 has the same configuration as that of a transfer terminal such as the conventional router, so that the description of the configuration is omitted. Transmission terminal 400, CCN router 510 and reception terminal 200, which are compliant nodes with CCN, are collectively referred to as "CCN node" as appropriate.

Reception terminal 200 receives distribution of video data by the aforementioned Voice Over CCN. That is, reception terminal 200 sequentially issues interest packets to respective small pieces of data that are obtained by dividing video data (hereinafter, referred to as "divided piece of data").

Summary of Communication Method

Next, a description will be given of the summary of a communication method in communication system 300.

In communication system 300, all real-time data streams to be transferred in CCN are named in advance. Such a name given to the real-time data stream is hereinafter referred to as "content name."

Example of Content Names

Figure 4:
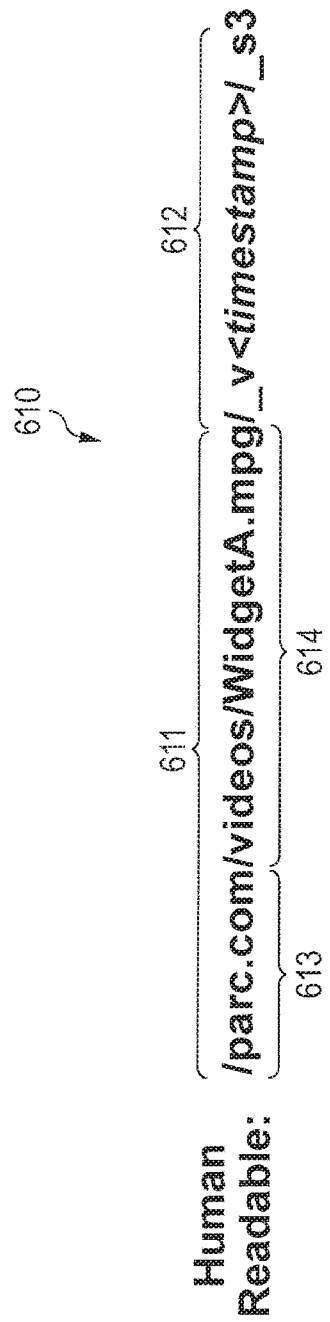
FIG. 4 illustrates an example of a content name in Embodiment 2 of the present invention.

FIG. 4 illustrates an example of content names.

As illustrated in FIG. 4, content name 610 includes user/app supplied name region 611 and versioning & segmentation region 612. User/app supplied name region 611 is formed of globally-routable name region 613 and organizational name region 614. Versioning & segmentation region 612 is a unit that is conventionally or automatically determined (conventional/automatic). Content name 610 is, for example, used after binary encoded.

Reception terminal 200 that acquires a content issues an interest packet to request transmission of a content, by specifying a content name.

In the present embodiment, a content name is a name space including identification information of a publisher of original video data, an ID to specify a call (call-ID), and a serial number of a divided piece of data (serial number of RTP) and a time stamp.

Configuration Example of Interest Packet

Figure 5:
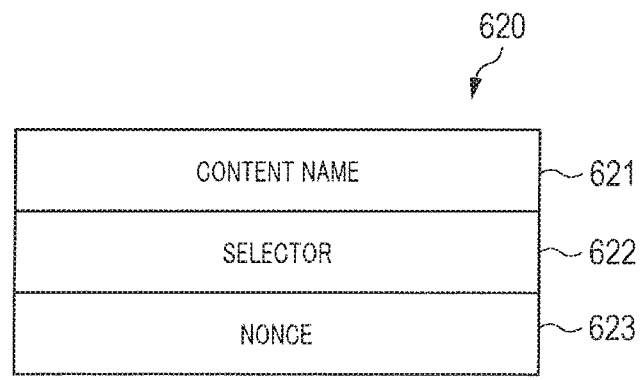
FIG. 5 is a schematic diagram illustrating a configuration example of an interest packet in Embodiment 2 of the present invention.

FIG. 5 is a schematic diagram of a configuration example of an interest packet.

As illustrated in FIG. 5, interest packet 620 includes content name 621, selector 622 and nonce 623. Content name 621 is a content name of divided pieces of video data that is specified to be returned by the request from the transmitter of interest packet 620. Nonce 623 is a nonce random number. Selector 622 is, for example, the priority of a request, a filter or a scope of a publication source or the like.

Interest packet 620 as mentioned above, by specifying a divided piece of video data, can show that distribution of the specified divided piece of data is requested by the transmitter of interest packet 620. Interest packet 620 is provided with, e.g., information of the transmitter of interest packet 620, which are not illustrated in the accompanying drawing.

A CCN node that stores (e.g., caches) a divided piece of data specified by an interest packet receives the interest packet and generates a packet that stores the specified divided piece of data (main signal). Such packet storing a divided piece of data is hereinafter referred to as "data packet." The relevant CCN node transmits the generated data packet to the transmitter of the interest packet.

Configuration Example of Data Packet

Figure 6:
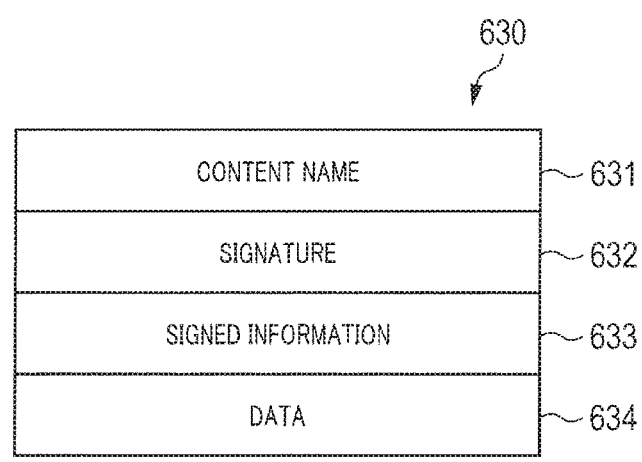
FIG. 6 is a schematic diagram illustrating a configuration example of a data packet in Embodiment 2 of the present invention.

FIG. 6 is a schematic diagram of an example of a configuration of a data packet.

As illustrate in FIG. 6, data packet 630 includes content name 631, signature 632, signed information 633 and data 634.

Data 634 is a divided piece of data stored in data packet 630. Content name 631 is a content name of a divided piece of data stored in data packet 630. Signature 632 is an electronic signature, which uses digest algorithm, witness or the like, for a divided piece of data stored in data packet 630.

Signed information 633 includes a publisher ID, a key locator and a stale time, which are signed.

Data packet 630 as mentioned above can be transmitted with storing a divided piece of video data while certifying authenticity of the divided piece of data. Data packet 630 is provided with, e.g., information of a transmitter and destination of data packet 630, which are not illustrated in the accompanying drawing.

In the communication method as mentioned above, each reception terminal 200 in communication system 300 can acquire a content based on a content name without knowing where the content is.

Next, a description will be given of the configurations of reception terminal 200, transmission terminal 400 and CCN router 510.

Figure 7:
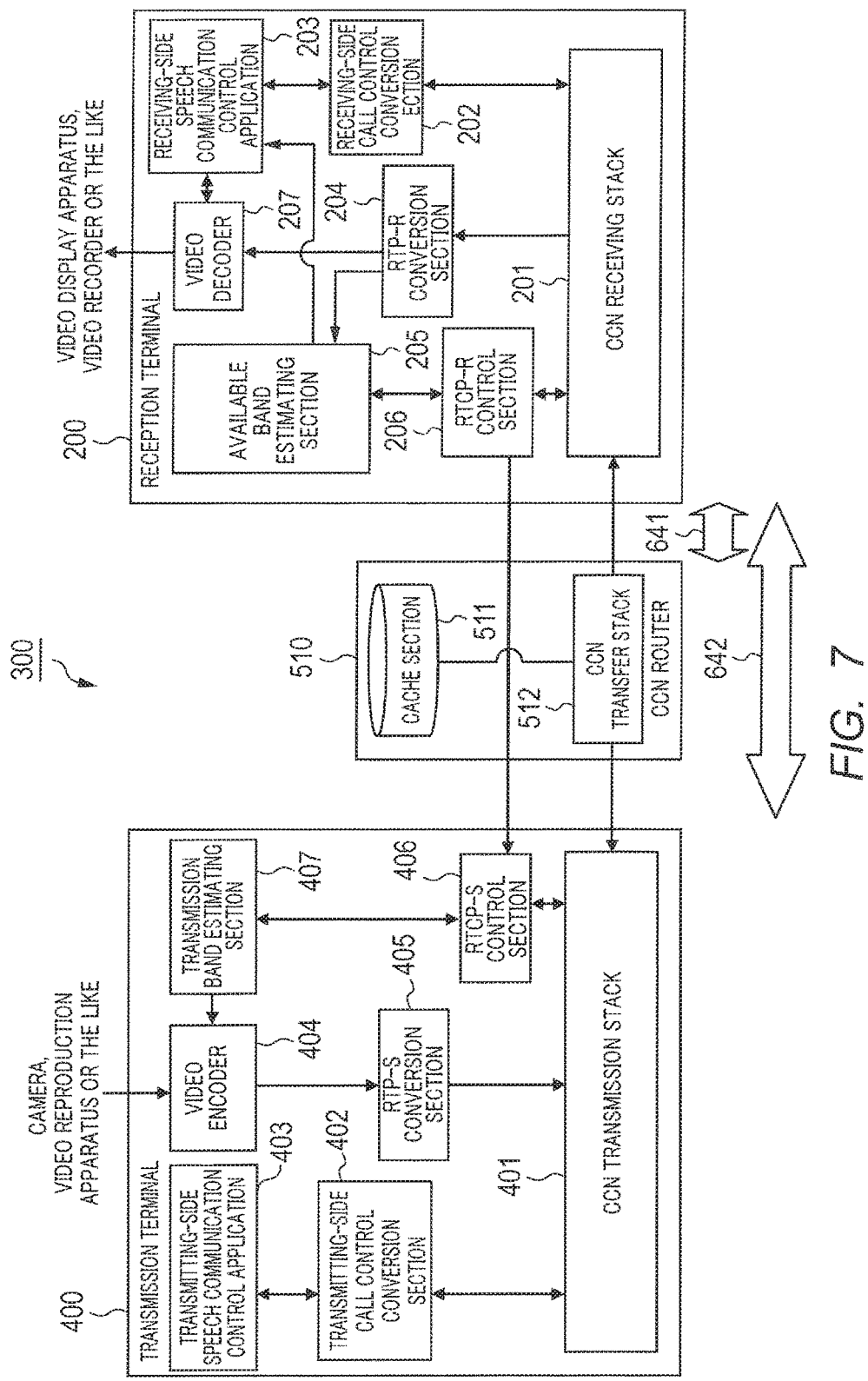
FIG. 7 is a block diagram illustrating a configuration example of each apparatus according to Embodiment 2 of the present invention.

FIG. 7 is a block diagram of an example of the configurations of reception terminal 200, transmission terminal 400 and CCN router 510.

Description of Reception Terminal

In FIG. 7, reception terminal 200 includes CCN receiving stack 201, receiving-side speech communication control application 203, receiving-side call control conversion section 202, RTP-R conversion section 204, video decoder 207, available band estimating section 205, and RTCP-R control section 206.

CCN receiving stack 201 performs a CCN protocol operation, and particularly receives a data packet in accordance with transmission of a data interest packet. In the present embodiment, CCN receiving stack 201 sequentially issues an interest packet having a specified content name and acquires a data packet. Accordingly, streaming transmission of video data is achieved. CCN receiving stack 201 outputs the received data packet to RTP-R conversion section 204. Further, CCN receiving stack 201 records an issue time of an interest packet and an arrival time of a data packet and notifies RTP-R conversion section 204 of the times.

Receiving-side call control conversion section 202 establishes a call with another CCN node via CCN receiving stack 201 to determine a codec, a port number or the like to be used in communication. That is, receiving-side call control conversion section 202 puts communication control by SIP (session initiation protocol) in a CCN interest packet, to exchange the communication control with the other CCN node (see NPL 3).

Receiving-side speech communication control application 203, which is a communication control application, instructs CCN receiving stack 201 to start and end communication with another CCN node, via receiving-side call control conversion section 202. Receiving-side speech communication control application 203 also instructs CCN receiving stack 201 and video decoder 207 to start and end catch-up reproduction. The details of catch-up reproduction will be described hereinafter.

RTP-R conversion section 204 extracts a divided piece of data from among data packets input by CCN receiving stack 201 and outputs the extracted divided piece of data to video decoder 207 in order of RTP serial numbers. RTP-R conversion section 204 calculates a loss event rate P and RTT between reception terminal 200 and another CCN node, based on the communication between reception terminal 200 and the other CCN node performed by CCN receiving stack 201. RTP-R conversion section 204 outputs the calculated loss event rate P and round trip time RTT to available band estimating section 205.

The loss event rate P may be calculated, for example, by monitoring a gap between serial numbers of data packets to detect loss of a data packet and using the method described in NPL 3 based on the loss of a data packet.

The round trip time RTT may be calculated, for example, by using a method described in RFC 3550 published by IETF (the Internet Engineering Task Force) or a standards organization for Internet-related techniques. In the method, a transmission time of a transmitting-side SR (sender report) is recorded and the round trip time RTT is calculated based on information in an RR (receiver report) returned from a receiving-side. The information sent as a reply from the receiving-side includes, for example, a time stamp, and delay time information from SR reception to RR transmission in reception terminal 200 (DLSR: delay since last SR).

In the following description, among CCN nodes that store (e.g., cache) video data that is a target to be acquired by each reception terminal 200, a CCN node that is most approximated to reception terminal 200 is referred to as "proximate CCN node." Which CCN node becomes a proximate CCN node depends on video data to be acquired, a connection point with reception terminal 200 and CCN network 500, and change in storage state of the video data in CCN network 500.

The lost event rate P between reception terminal 200 and the proximate CCN node is referred to as "proximity loss event rate Pn" (first loss event rate). The round trip time RTT between reception terminal 200 and the proximate CCN node (section indicated by arrow 641 in FIG. 7) is "proximity round trip time RTTn" (first RTT). The loss event rate P between reception terminal 200 and transmission terminal 400 (section indicated by arrow 642 in FIG. 7) is referred to as "ordinary loss event rate Ps" (second loss event rate). The round trip time RTT between reception terminal 200 and transmission terminal 400 is referred to as "ordinary round trip time RTTs" (second RTT).

Available band estimating section 205 calculates an estimation value Xcal of an available band between reception terminal 200 and the corresponding CCN node from the input loss event rate P and round trip time RTT, by using Equation 1 mentioned above. Available band estimating section 205 outputs the calculated estimation value Xcal of the available band to RTCP-R control section 206.

In the following description, the estimating value Xcal of the available band between reception terminal 200 and the proximate CCN node that is calculated from the proximity loss event rate Pn and the proximity round trip time RTTn is referred to as "proximate band estimation value Xcaln" (first available band). The estimation value Xcal of the available band between reception terminal 200 and transmission terminal 400 that is calculated from the ordinary loss event rate Ps and the ordinary round trip time RTTs is referred to as "ordinary band estimation value Xcals" (second available band).

Available band estimating section 205 also notifies receiving-side speech communication control application 203 of a proximate band estimation value Xcaln. The notification is made for catch-up reproduction, which will be described hereinafter.

RTCP-R control section 206 requests the proximate CCN node to transfer a data packet utilizing a band that is indicated as the proximate band estimation value Xcaln by the proximate CCN node. More specifically, RTCP-R control section 206 outputs the proximate band estimation value Xcaln to CCN receiving stack 201. RTCP-R control section 206 causes CCN receiving stack 201 to sequentially transmit an interest packet that is a divided piece of video data to be acquired and is specified by a content name, at intervals corresponding to the proximate band estimation value Xcaln.

Further, RTCP-R control section 206 notifies transmission terminal 400 of the ordinary band estimation value Xcals via CCN receiving stack 201. As a result, transmission terminal 400 transmits the divided pieces of video data by utilizing the band indicated by the ordinary band estimation value Xcals. This will be described later. The divided pieces of data are input to video decoder 207 via CCN receiving stack 201 and RTP-R conversion section 204, as described above.

RTCP-R control section 206 may notify transmission terminal 400 of not only the ordinary band estimation value Xcals but also additional information other than the ordinary band estimation value Xcals. Examples of the additional information include a time stamp of a data packet that stores a part of data that is currently being reproduced of the video data, a serial number of the data packet, and a round trip time RTT between transmission terminal 400 and reception terminal 200.

Video decoder 207 decodes the divided pieces of data input from RTP-R conversion section 204 to the original video data, and outputs the decoded video data to a video output apparatus such as an image display apparatus or a recorder (not illustrated) that is connected with reception terminal 200. Video decoder 207 acquires a data amount of video data under decoding from, e.g., header information of the data packet, and notifies receiving-side speech communication control application 203 of the data amount. The notification is made for catch-up reproduction, which will be described later.

A product of an available band and delay (half of a round trip time RTT) between transmission terminal 400 and reception terminal 200 differs from that between CCN router 510 and reception terminal 200.

Description of Transmission Terminal

In FIG. 7, transmission terminal 400 includes CCN transmission stack 401, transmitting-side speech communication control application 403, transmitting-side call control conversion section 402, video encoder 404, RTP-S conversion section 405, RTCP-S control section 406, and transmission band estimating section 407.

CCN transmission stack 401 performs a CCN protocol operation, and particularly, transmits a data packet in accordance with reception of an interest packet.

RTCP-S control section 406 is notified of an ordinary band estimation value Xcals by reception terminal 200. On the notification, the function of transmission band estimating section 407 causes CCN transmission stack 401 to transmit a data packet using an ordinary band estimation value Xcals.

Transmitting-side call control conversion section 402 establishes a call with another CCN node via CCN transmission stack 401, and determines a codec and port number to be used in communication. That is, transmitting-side call control conversion section 402 puts communication control by SIP that in a CCN data packet, to exchange the communication control with the other CCN node (see NPL 3).

Transmitting-side speech communication control application 403, which is a communication control application, instructs CCN transmission stack 401 to start and end communication with another CCN node, via transmitting-side call control conversion section 402.

Video encoder 404 receives real-time data of video (video data) from a video input apparatus such as a camera or video reproduction apparatus (not illustrated). Video encoder 404 encodes the received video data in accordance with a target bit rate notified from transmission band estimating section 407, which will be described later. Video encoder 404 then outputs the encoded video data to RTP-S conversion section 405.

RTP-S conversion section 405 divides the video data input from video encoder 404 into multiple divided pieces of data. RTP-S conversion section 405 provides the divided piece of data with a RTP packet header including information of, e.g., an RTP serial number, a time stamp, and a marker bit, and associates the divided piece of data with a content name, thereby generating a CCN data packet. RTP-S conversion section 405 then transmits the generated data packet to reception terminal 200 via CCN transmission stack 401.

RTCP-S control section 406 receives a notification of an ordinary band estimation value Xcals from RTCP-R control section 206 of reception terminal 200 via CCN transmission stack 401. RTCP-S control section 406 then outputs the notified ordinary band estimation value Xcals to transmission band estimating section 407. If RTCP-S control section 406 is notified of the aforementioned additional information, RTCP-S control section 406 may also output the additional information with the ordinary band estimation value Xcals to transmission band estimating section 407.

Transmission band estimating section 407 determines a band to be applied to reception terminal 200 that is a transmitter of the ordinary band estimation value Xcals, based on the information including at least the ordinary band estimation value Xcals input from RTCP-S control section 406. Transmission band estimating section 407 then notifies video encoder 404 of a target bit rate that allows transmission of video data (transmission of packets) using the determined band.

Transmission band estimating section 407 may determine, directly as a band to be applied to reception terminal 200 that is a transmitter of the ordinary band estimation value Xcals, the ordinary band estimation value Xcals notified by reception terminal 200. In that case, transmission band estimating section 407 results in causing CCN transmission stack 401 to utilize the ordinary band estimation value Xcals notified by reception terminal 200 to transmit a data packet in an indirect manner.

Description of CCN Router

In FIG. 7, CCN router 510 includes cache section 511 and CCN transfer stack 512.

Cache section 511 caches a copy of a data packet having been transferred by CCN router 510, of data packets transmitted from transmission terminal 400.

CCN transfer stack 512 performs a CCN protocol operation. That is, CCN transfer stack 512 receives an interest packet transmitted from reception terminal 200, and if no corresponding data packet is cached in cache section 511, CCN transfer stack 512 transfers the received interest packet.

CCN transfer stack 512 also transfers a data packet that is transmitted from transmission terminal 400, to reception terminal 200 that is the transmitter of the data packet. CCN transfer stack 512 causes cache section 511 to cache a copy of the data packet. In response to a request by reception terminal 200, CCN transfer stack 512 transfers the data packet cached in cache section 511 to reception terminal 200.

That is, CCN transfer stack 512 receives an interest packet transmitted from reception terminal 200. If a corresponding data packet is cached in cache section 511, CCN transfer stack 512 returns the data packet to a transmitter of the interest packet.

Reception terminal 200, transmission terminal 400 and CCN router 510 each include, for example, a CPU, a storage medium such as a ROM that stores a control program, a working memory such as a RAM and a communication circuit or the like, which are not illustrated. In this case, functions of the sections described above are achieved by the CPU executing the control program.

Next, a description will be given of the operations of reception terminal 200, transmission terminal 400 and CCN router 510.

Description of Operation of Reception Terminal

Figure 8:
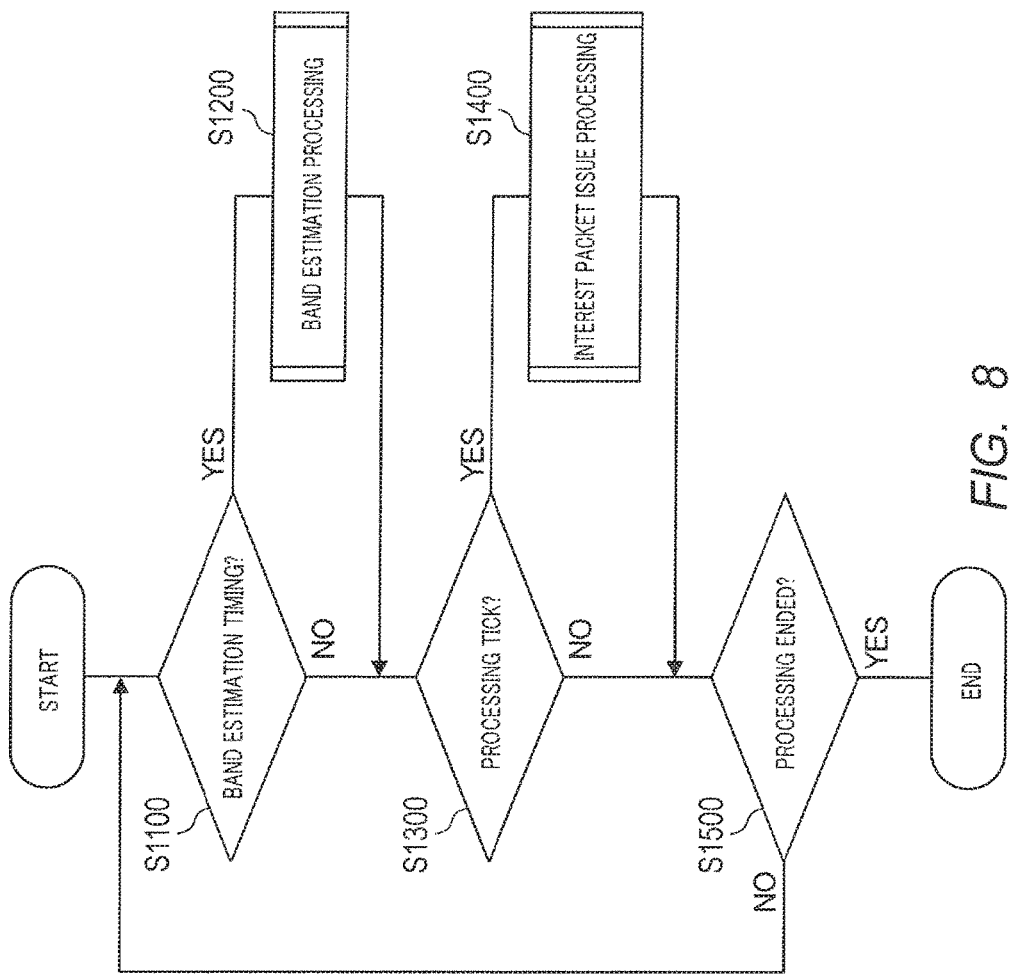
FIG. 8 is a flowchart illustrating an operation example of a reception terminal according to Embodiment 2 of the present invention.

FIG. 8 is a flowchart of an example of the operation of reception terminal 200.

In step S1100, RTP-R conversion section 204 determines whether a timing for estimation of a proximate band estimation value Xcaln and an ordinary band estimation value Xcals (hereinafter, referred to as "band estimation timing") has come or not. The band estimation timing is, for example, a timing at which a predetermined time-out period, which is measured, e.g., by a timer, has elapsed or a timing at which CCN receiving stack 201 receives a data packet.

If RTP-R conversion section 204 receives an RTP packet, RTP-R conversion section 204 itself detects the RTP packet. If an RTCP packet is received, RTP-R conversion section 204 detects the RTCP packet by being notified by CCN receiving stack 201. A time-out period, which is set for detecting arrival of no packet for a long time, is, for example, 100 ms.

If the band estimation timing has come (S1100: YES), RTP-R conversion section 204 advances to step S1200. If the band estimation timing has not come (S1100: NO), RTP-R conversion section 204 advances to step S1300, which will be described later.

In step S1200, reception terminal 200 performs band estimation processing at RTP-R conversion section 204, available band estimating section 205, and RTCP-R control section 206. In the band estimation processing, a proximate band estimation value Xcaln and an ordinary band estimation value Xcals are estimated. The band estimation processing will be described later.

In step S1300, CCN receiving stack 201 determines whether a processing TICK has come or not. The processing TICK is a timing that regularly comes every predetermined time interval. The predetermined time interval is generally 4 ms or 1 ms for Linux (registered trademark) OS which is widely used for incorporated terminals. However, the predetermined time interval is not limited to the aforementioned numerical values. The predetermined time interval is not limited to this value, but should be equal to or shorter than the ordinary band estimation value Xcals.

If the processing TICK has come (S1300: YES), CCN receiving stack 201 advances to step S1400. If the processing TICK has not come (S1300: NO), CCN receiving stack 201 advances to step S1500, which will be described later.

In step S1400, CCN receiving stack 201 performs interest packet issue processing. In the interest packet issue processing, full use of a band indicated by the proximate band estimation value Xcaln is made and an interest packet is issued. More specifically, to issue an interest packet so as to receive a data packet in the specified band width, the number of issued tokens is controlled by a so-called token bucket method, in the processing. The issue processing of interest packets will be described later.

In step S1500 in FIG. 8, RTP-R conversion section 204 determines whether user's operation or the like instructs the processing to end or not.

If the processing is not instructed to end (S1500: NO), RTP-R conversion section 204 returns to step S1100. If the processing is instructed to end (S1500: YES), RTP-R conversion section 204 ends a sequence of the processing.

Band Estimation Processing of Reception Terminal 200

Figure 9:
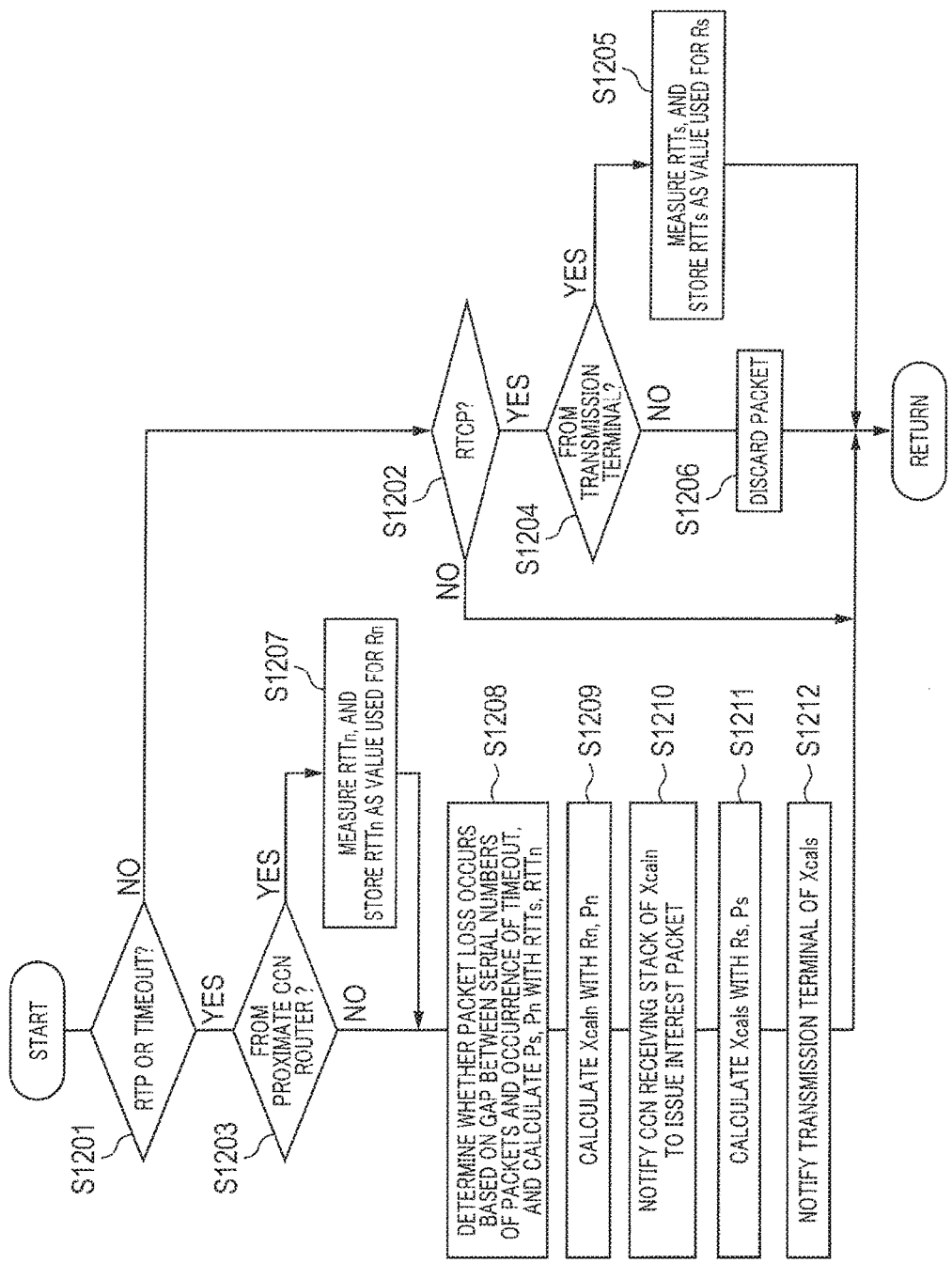
FIG. 9 is a flowchart illustrating an example of band estimation processing of the reception terminal according to Embodiment 2 of the present invention.

FIG. 9 is a flowchart of an example of the band estimation processing of reception terminal 200 (step S1200 in FIG. 8).

In step S1201, RTP-R conversion section 204 determines whether arrival of the band estimation timing is an event caused by reception of an RTP packet or timeout or not.

If arrival of the band estimation timing is not an event caused by reception of an RTP packet or timeout (S1201: NO), RTP-R conversion section 204 advances to step S1202. If arrival of the band estimation timing is an event caused by reception of an RTP packet or timeout (S1201: YES), RTP-R conversion section 204 advances to step S1203.

In step S1202, RTP-R conversion section 204 determines whether arrival of the band estimation timing is an event caused by reception of an RCTP packet or not.

If arrival of the band estimation timing is an event caused by reception of an RCTP packet (S1202: YES), RTP-R conversion section 204 advances to step S1204. If arrival of the band estimation timing is not an event caused by reception of an RCTP packet (S1202: NO), RTP-R conversion section 204 returns to the processing in FIG. 8.

In step S1204, RTP-R conversion section 204 determines whether the received RCTP packet is transmitted from transmission terminal 400 or not.

If the received RCTP packet is transmitted from transmission terminal 400 (step S1204: YES), RTP-R conversion section 204 advances to step S1205. If the received RCTP packet is not transmitted from transmission terminal 400 (S1204: NO), RTP-R conversion section 204 advances to step S1206.

In step S1205, RTP-R conversion section 204 calculates (measures) an ordinary round trip time RTTs based on the RCTP packet. RTP-R conversion section 204 stores the calculated ordinary round trip time RTTs as a value to be used for a parameter Rs in a memory region which can be referred in other processing, and returns to the processing in FIG. 8. The parameter Rs is a parameter to determine an ordinary round trip time RRTs to be notified to transmission terminal 400. The parameter Rs is a load moving average value of a plurality of the measured ordinary round trip times RRTs.

In step S1206, RTP-R conversion section 204 discards the received packet and returns to the processing in FIG. 8.

That is, each time receiving an RCTP packet transmitted from transmission terminal 400, RTP-R conversion section 204 measures an ordinary round trip time RTTs and stores the measured value in the parameter Rs.

In step S1203, RTP-R conversion section 204 determines whether received arrival of the band estimation timing is an event caused by reception of an RTP packet from a proximate CCN node or not.

If the arrival of the band estimation timing is an event caused by reception of a RTP packet from a proximate CCN node (S1203: YES), RTP-R conversion section 204 advances to step S1207. If the arrival of the band estimation timing is not caused by reception of an RTP packet from a proximate CCN node (S1203: NO), RTP-R conversion section 204 advances to step S1208.

The determination can be made based on, for example, whether an IP address of transmission terminal 400 coincides with an IP address of a transmitter of the packet or not. That is, if the IP address of the transmitter of the packet does not coincide with the IP address of transmission terminal

400, RTP-R conversion section 204 can determine that the received packet is a data packet transmitted from the proximate CCN node. The reliability of the content of the data may be checked by authentication or encryption of each packet, as disclosed in NPL 1.

In step S1207, RTP-R conversion section 204 calculates (measures) the proximity round trip time RTTn based on the RTP packet. RTP-R conversion section 204 stores the calculated proximity round trip time RTTn as a value to be used for a parameter Rn in a memory region which can be referred in other processing. The parameter Rn is a parameter to determine a proximate round trip time RTTn to be used for determination of a transmission frequency of interest packets. The parameter Rn is a load moving average value of a plurality of the measured proximity round trip times RTTn.

In step S1208, RTP-R conversion section 204 calculates the proximity loss event Pn and the ordinary loss event rate Ps.

More specifically, RTP-R conversion section 204 records serial numbers of packets, and determines an occurrence of packet loss from a gap between the serial numbers of the packets and the occurrence of timeout. RTP-R conversion section 204 calculates a proximity loss event rate Pn and an ordinary loss event rate Ps by the method described in NPL 3.

Regarding the loss event rate, multiple losses occurred in one round trip time RTT is calculated as a loss event rate. In the calculation of the proximity loss event rate Pn and the ordinary loss event rate Ps, parameters Rn and Rs are regarded as round trip times, respectively.

RTP-R conversion section 204 calculates the proximity loss event rate Pn by using the proximity round trip time RTTn (parameter Rn). RTP-R conversion section 204 calculates the ordinary loss event rate Ps by using the ordinary round trip time RTTs (parameter Rs). RTP-R conversion section 204 records the calculated results in a memory region which can be referred in other processing.

In step S1209, available band estimating section 205 substitutes the proximity round trip time RTTn and the proximity loss event rate Pn into Equation 1 to calculate a proximate band estimation value Xcaln.

In step S1210, RTCP-R control section 206 notifies CCN receiving stack 201 of the calculated proximate band estimation value Xcaln for issuing interest packets. The notification is to notify a lower layer of a value calculated by the band estimation in an upper layer and the mechanism of flow rate control. If an interest packet is transmitted in accordance with thus notified proximate band estimation value Xcaln, TCP fairness between reception terminal 200 and the proximate CCN node is guaranteed by the upper layer.

In step S1211, available band estimating section 205 substitutes the ordinary round trip time RTTs and the ordinary loss event rate Ps into Equation 1 to calculate an ordinary band estimation value Xcals.

In step S1212, RTCP-R control section 206 notifies transmission terminal 400 of the calculated ordinary band estimation value Xcals by transmitting an RTCP packet, and returns to the processing in FIG. 8.

More specifically, RTCP-R control section 206 puts the ordinary band estimation value Xcals in an RTCP packet in a predetermined form defined in advance by communication system 300 (hereinafter, referred to as "RTCP packet for band estimation") to transmit the RTCP packet to transmission terminal 400. At this time, RTCP-R control section 206 also transmits a serial number of a received packet and a time stamp of video data currently being reproduced, by using an RTCP packet for band estimation.

The RTCP packet for band estimation may be a packet in a format extended uniquely with an RTCP APP format in an experimental implement, or may be a packet in a format separately defined as a report of a specific format.

The reason for the transmission of a serial number and a time stamp together to transmission terminal 400 is to notify transmission terminal 400 of whether reception terminal 200 performs catch-up reproduction or not. The reason for that is to identify whether the RTCP packet is feedback from reception terminal 200 acquiring video data having been transmitted from CCN router 510 in the past and reproducing the video data, or the RTCP packet is feedback from reception terminal 200 performing real-time reproduction.

Interest Packet Issue Processing

Figure 10:
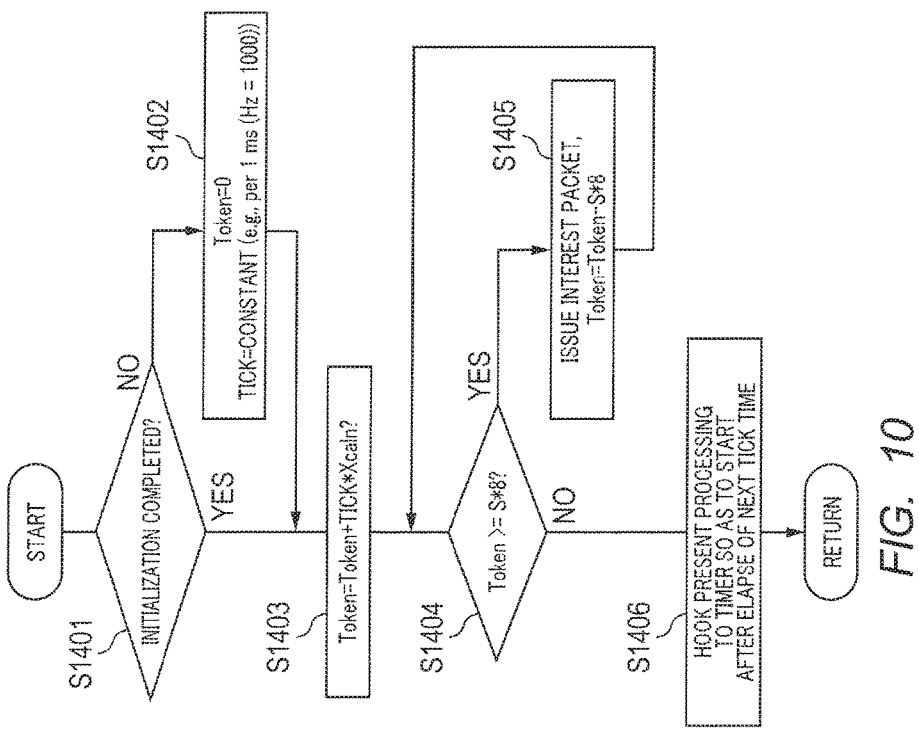
FIG. 10 is a flowchart illustrating an example of interest packet issue processing in Embodiment 2 of the present invention.

FIG. 10 is a flowchart of an example of the interest packet issue processing (step S1400 in FIG. 8).

In step S1401, CCN receiving stack 201 determines whether initialization of the processing is completed or not.

If initialization of the processing is not completed (S1401: NO), CCN receiving stack 201 advances to step S1402. If initialization of the processing is completed (S1401: YES), CCN receiving stack 201 advances to step S1403.

In step S1402, CCN receiving stack 201 substitutes a value of 0 for the parameter Token, and a constant for defining a time period until the next operation of the present processing for the parameter TICK. For the parameter TICK, for example, a value indicating operation as per 1 ms (Hz=1000) is substituted.

In step S1403, CCN receiving stack 201 adds a product of the parameter TICK and the proximate band estimation value Xcaln to the parameter Token.

In step S1404, CCN receiving stack 201 determines whether the parameter Token is equal to or higher than a packet size conversion value S*8 [bit] that is obtained by converting a value of a packet size S [byte] into bits.

If the parameter Token is equal to or higher than the packet size conversion value S*8 [bit] (S1404: YES), CCN receiving stack 201 advances to step S1405. If the parameter Token is lower than the packet size conversion value S*8 [bit] (S1404: NO), CCN receiving stack 201 advances to step S1406.

In step S1405, CCN receiving stack 201 issues an interest packet, subtracts the packet size conversion value S*8 [bit] from the parameter Token, and returns to step S1404. The value to be subtracted from the parameter Token corresponds to the amount of issued interest packets.

That is, while the parameter Token is larger than the packet size, CCN receiving stack 201 continues to issue an interest packet until the parameter Token becomes lower than the packet size.

The token bucket processing by CCN receiving stack 201 is different from general token bucket processing. The difference in the processing is that a packet size (S) is not a size of an interest packet issued by reception terminal 200 but a size of a data packet received by reception terminal 200.

General token bucket processing is used to control a flow rate of interest packets issued by reception terminal 200. In contrast, the token bucket processing by CCN receiving stack 201 is used for control of continuous acquisition of a necessary sufficient amount of data packets for utilizing (filling) the available band from the proximate CCN node to reception terminal 200. That is, in the token bucket processing by CCN receiving stack 201, an interest packet is issued such that a necessary sufficient amount of data packets is continuously acquired.

That is, the token bucket processing by CCN receiving stack 201 controls a flow rate in a direction opposite to a direction of a generally controlled flow rate.

The packet size S [byte] may be statically determined based on a type of media that is determined by call control information exchanged between transmitting-side speech communication control application 403 and receiving-side speech communication control application 203 at the beginning of communication.

For example, for video data communicated with a packet length of 1500 bytes, CCN receiving stack 201 determines S=1500.

Alternatively, for example, CCN receiving stack 201 statistically calculates a packet length of received packets and applies the calculation result as the packet size S [byte]. Specifically, for example, CCN receiving stack 201 uses a value that is obtained by applying an index load average to a packet length of n data packets in the past (n is a positive integer).

Alternatively, for example, CCN receiving stack 201 sequentially records packet lengths of received data packets in a format such as an array, a list or a queue in a storage region. For each processing of step S1404 or S1405, CCN receiving stack 201 uses the recorded values sequentially from the first (oldest) value in the storage region.

In step S1406, CCN receiving stack 201 hooks the present processing to a timer so as to start after the elapse of a next TICK time, and returns to the processing in FIG. 8.

Description of Operation of Transmission Terminal

Figure 11:
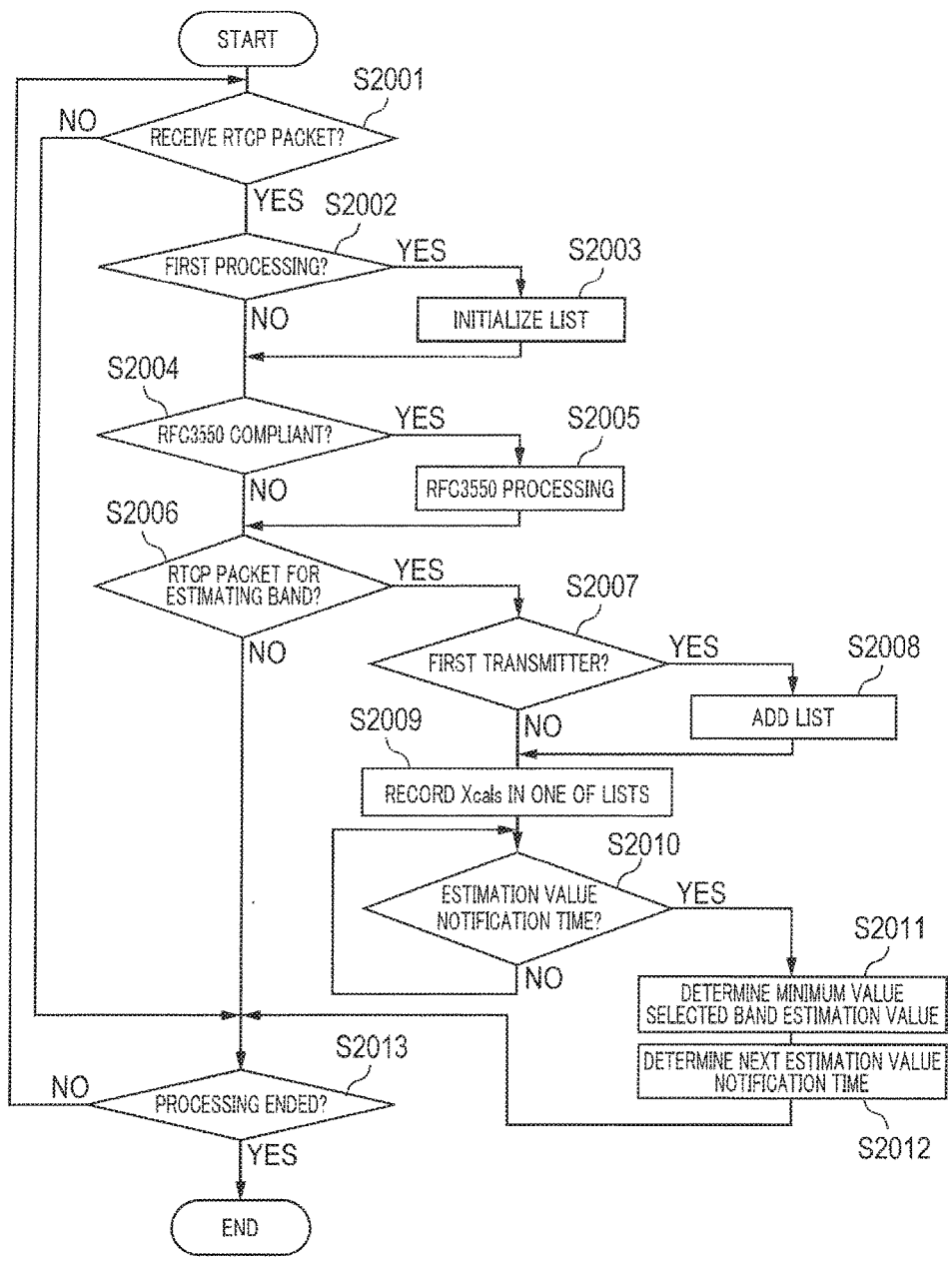
FIG. 11 is a flowchart illustrating an operation example of a transmission terminal according to Embodiment 2 of the present invention.

FIG. 11 is a flowchart of an example of operation of the transmission terminal.

In step S2001, RTCP-S control section 406 determines whether an RTCP packet is received or not.

If an RTCP packet is received (S2001: YES), RTCP-S control section 406 advances to step S2002. If an RTCP packet is not received (S2001: NO), RTCP-S control section 406 advances to step S2013, which will be described later.

In step S2002, RTCP-S control section 406 determines whether the reception of the RTCP packet is the first RTCP packet reception processing or not.

If the reception of the RTCP packet is the first RTCP packet reception processing (S2002: YES), RTCP-S control section 406 advances to step S2003. If the reception of the RTCP packet is not the first RTCP packet reception processing (S2002: NO), RTCP-S control section 406 advances to step S2004.

In step S2003, RTCP-S control section 406 clears a list of reception terminals 200 that has been created in past. The list of reception terminals 200 is used when transmission to a plurality of terminals is performed. This list is a list of structures storing information of reception terminals 200. In step S2003, RTCP-S control section 406 initializes the contents of the list to a state for allowing the contents to increase. RTCP-S control section 406 initializes a next estimation value notification time to be stored in the storage region to a time that is obtained by adding a TICK time to a current time which is the first processing time.

In step S2004, RTCP-S control section 406 determines whether the received RTCP packet conforms to RFC 3550 or not.

If the received RTCP packet conforms to RFC 3550 (S2004: YES), RTCP-S control section 406 advances to step S2005. If the received RTCP packet does not conform to RFC 3550 (S2004: NO), RTCP-S control section 406 advances to step S2006.

In step S2005, RTCP-S control section 406 processes the received RTCP packet according to RFC 3550. The processing is, for example, a typical receiver report processing.

In step S2006, RTCP-S control section 406 determines whether the received RTCP packet is the aforementioned RTCP packet for band estimation or not.

If the received RTCP packet is the RTCP packet for band estimation (S2006: YES), RTCP-S control section 406 advances to step S2007. If the received RTCP packet is not the RTCP packet for band estimation (S2006: NO), RTCP-S control section 406 advances to step S2013, which will be described later.

In step S2007, RTCP-S control section 406 determines whether a transmitter of the received RTCP packet for band estimation is the first transmitter or not. The first transmitter is a CCN node that has never transmitted an RTCP packet for band estimation to transmission terminal 400.

If the transmitter of the received RTCP packet for band estimation is the first transmitter (S2007: YES), RTCP-S control section 406 advances to step S2008. If the transmitter of the received RTCP packet for band estimation is not the first transmitter (S2007: NO), RTCP-S control section 406 advances to step S2009.

In step S2008, RTCP-S control section 406 adds an IP address of the transmitter of the received RTCP packet for band estimation into the list of reception terminals 200.

In step S2009, RTCP-S control section 406 extracts an ordinary band estimation value Xcals that is stored in an RTCP packet for band estimation from the received RTCP packet for band estimation. Further, RTCP-S control section 406 searches the list of reception terminals 200 for the IP address of the transmitter of the received RTCP packet for band estimation. RTCP-S control section 406 records the extracted ordinary band estimation value Xcals to a corresponding element in the list.

RTCP-S control section 406 may further record a time stamp and serial number included in the RTCP packet for band estimation or the ordinary round trip time RTTs calculated from the RTCP packet for band estimation into the list of reception terminals 200.

In step S2010, RTCP-S control section 406 acquires a current time of transmission terminal 400 and determines whether the current time is when a next estimation value notification time stored in the storage region has passed (elapsed) or not.

If the current time is not when a next estimation value notification time has not passed (S2010: NO), RTCP-S control section 406 repeats the determination processing in step S2010. If the current time is when a next estimation value notification time has passed (S2010: YES), RTCP-S control section 406 advances to step S2011.

In step S2011, transmission band estimating section 407 searches the list of reception terminals 200 for a minimum value of ordinary band estimation values Xcals recorded in the list. Transmission band estimating section 407 determines the searched minimum value as an ordinary band estimation value Xcals to be used for the flow rate control in the upper layer. Transmission band estimating section 407 notifies video encoder 404 of the determined ordinary band estimation value Xcals as information to determine a target bit rate for a next encoding.

When searching for the minimum value of the ordinary band estimation values Xcals, transmission band estimating section 407 may use information such as a time stamp, a serial number, or an ordinary round trip time RTTs to skip some ordinary band estimation values Xcals. That is, transmission band estimating section 407 may ignore an ordinary band estimation Xcals from reception terminal 200 that is performing catch-up reproduction. Alternatively, transmission band estimating section 407 may ignore an ordinary band estimation value Xcals from reception terminal 200 that has not issued an interest packet within the ordinary round trip time RTTs.

Video encoder 404 may subtract, from the notified ordinary band estimation value Xcals, part or all among from bit rates such as an amount corresponding to a packet header overhead, an amount corresponding to an amount of retransmitted packets at the time of data packet loss, a redundant code amount, e.g., FEC. Video encoder 404 may determine a target bit rate from the values subject to the subtraction.

In step S2012, RTCP-S control section 406 determines and stores a next estimation value notification time.

In step S2013, RTP-S conversion section 405 determines whether user's operation or the like instructs the processing to end or not.

If the processing is not instructed to end (S2013: NO), RTP-S conversion section 405 returns to step S2001. If the processing is instructed to end (S2013: YES), RTP-S conversion section 405 ends a sequence of the processing.

Description of Operation of CCN Router

Figure 12:
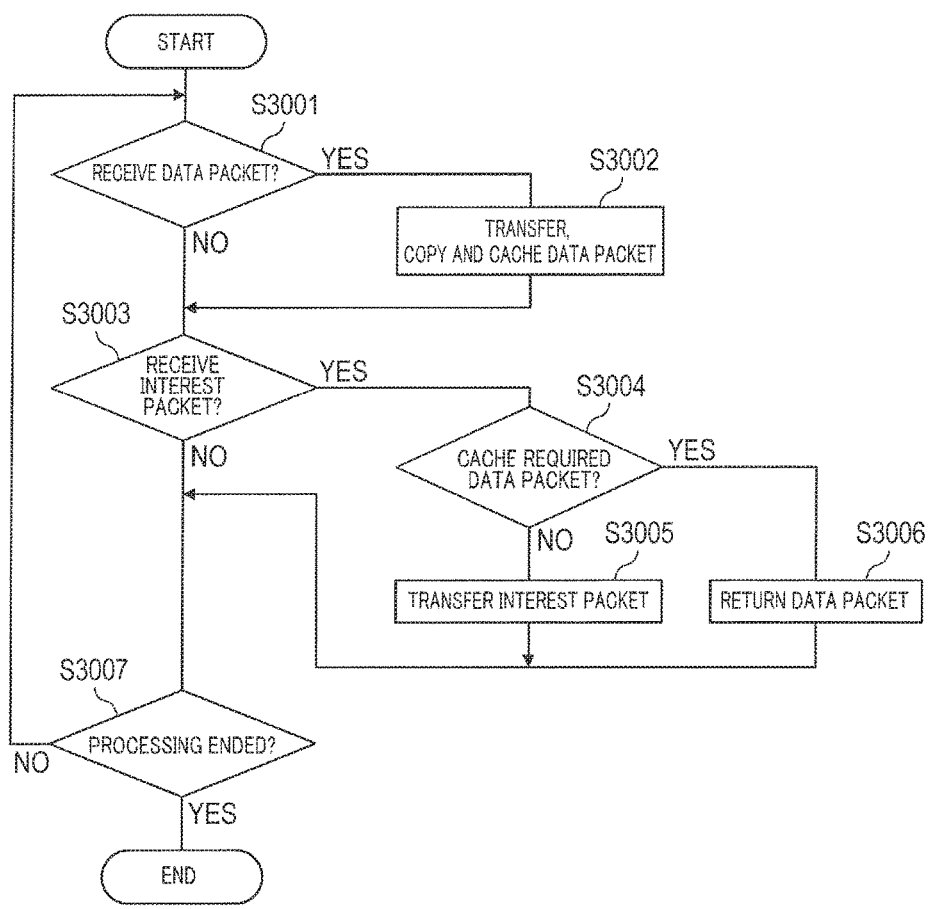
FIG. 12 is a flowchart illustrating an operation example of a CCN router (transfer terminal) of Embodiment 2 of the present invention.

FIG. 12 is a flowchart of an example of operation of CCN router 510.

In step S3001, CCN transfer stack 512 determines whether a data packet transmitted from transmission terminal 400 is received or not. If a data packet is received (S3001: YES), CCN transfer stack 512 advances to step S3002. If a data packet is not received (S3001: NO), CCN transfer stack 512 advances to step S3003.

In step S3002, CCN transfer stack 512 transfers the received data packet to reception terminal 200 that is a destination of the data packet. Further, CCN transfer stack 512 copies the received data packet and caches the copy in cache section 511.

In step S3003, CCN transfer stack 512 determines whether an interest packet transmitted from reception terminal 200 is received or not. If an interest packet is received (S3003: YES), CCN transfer stack 512 advances to step S3004. If an interest packet is not received (S3003: NO), CCN transfer stack 512 advances to step S3007, which will be described later.

In step S3004, CCN transfer stack 512 determines whether a data packet that is requested to be transmitted by the received interest packet is cached in cache section 511 or not. If the data packet is not cached (S3004: NO), CCN transfer stack 512 advances to step S3005. If the data packet is cached (S3004: YES), CCN transfer stack 512 advances to step S3006.

In step S3005, CCN transfer stack 512 transfers the received interest packet to anther CCN node in accordance with a forwarding information base (FIB) in a name space held in advance. For example, the interest packet may finally reach transmission terminal 400.

In step S3006, CCN transfer stack 512 acquires, from cache section 511, the data packet that is requested by the received interest packet, and returns the data packet to a transmitter of the interest packet.

In step S3007, CCN transfer stack 512 determines whether user user's operation or the like instructs the processing to end or not. If the processing is not instructed to end (S3007: NO), CCN transfer stack 512 returns to step S3001. If the processing is instructed to end (S3007: YES), CCN transfer stack 512 ends a sequence of the processing.

CCN transfer stack 512 also has a same function as a general router. That is, to transfer a unicast packet, CCN transfer stack 512 searches a forwarding information base (FIB) for transferring an IP with a transfer destination IP address and transfers the unicast packet to an appropriate interface. For example, an RTCP packet transmitted from reception terminal 200 to transmission terminal 400 is transferred to transmission terminal 400 based on the forwarding information base for transferring an IP.

Description of Catch-Up Reproduction

Next, a description of catch-up reproduction will be given in details.

Receiving-side speech communication control application 203 mentioned above determines a method for acquiring and reproducing video data based on the proximate band estimation value Xcaln notified by available band estimating section 205 and a data amount of video data notified by video decoder 207. Examples of the methods for acquiring and reproducing video data include reproducing the video data with moving a reproduction time ahead, and acquiring the video data while thinning out (skipping) part of pictures constituting the video data.

If reception terminal 200 is the aforementioned "other reception terminal," a data packet to be acquired has been already cached in a proximate CCN node.

Thus, if the available band from the proximate CCN node to reception terminal 200 is large, reception terminal 200 can receive data packets at a rate higher than a rate at which transmission terminal 400 transmits the data packets. For example, if the proximate band estimation value Xcaln is equal to or larger than a band required for a double amount of video data, receiving-side speech communication control application 203 instructs CCN receiving stack 201 to issue interest packets at a frequency that is a double frequency of the usual frequency.

Accordingly, if the video data is, for example, live data of a meeting, joining the meeting halfway is allowed by double reproduction of the content of the meeting until then.

If the available band from the proximate CCN node to reception terminal 200 is small, reception terminal 200 can receive data packets only at a rate lower than a rate at which transmission terminal 400 transmits the data packets. Thus, if a proximate band estimation value Xcaln is lower than a band required for a data amount of video data, for example, receiving-side speech communication control application 203 acquires the video data by skipping some pieces of the video data to achieve frame-by-frame feeding of still images of the video data. More specifically, receiving-side speech communication control application 203 instructs CCN receiving stack 201 to issue interest packets while skipping some of the interest packets.

In this way, video data to be reproduced can be acquired and reproduced while maintaining TCP fairness, although a quality of the video data is decreased.

Descriptions will be given of the summary of the operation of system 300 in a case of catch-up reproduction, with reference to FIG. 3.

The following description exemplifies a case where video data is first acquired by first reception terminal $200_1$ from transmission terminal 400, and immediately after that, is acquired by second reception terminal $200_2$.

In accordance with a same procedure as that in call control of Voice Over CCN disclosed by NPL 3, transmission terminal 400 establishes a call with first reception terminal $200_1$. That is, a CCN interest packet delivers a message for call control by an ordinary SIP (written by session description protocol) issued by first reception terminal $200_1$ to transmission terminal 400.

Continuous issue of the interest packets with specified RTP serial numbers by first reception terminal $200_1$ causes divided pieces of video data to be delivered from transmission terminal 400 to first reception terminal $200_1$.

In other words, in the divided piece of video data, ID and serial number that specify a call and a name space including a time stamp are defined. CCN network 500 operates with recognizing transmission terminal 400 as a publisher of the name space. On the basis of that, interest packets corresponding to divided pieces of data are continuously issued from first reception terminal $200_1$. Accordingly, a packet storing a divided piece of data is transferred from transmission terminal 400 to first reception terminal $200_1$.

In this way, video data is transmitted from transmission terminal 400 to first reception terminal $200_1$.

In this case, the proximate CCN node for first reception terminal $200_1$ is not CCN router 510 in CCN network 500 (e.g., common CCN node) but transmission terminal 400. The reason is that any of CCN router 510 and non-CCN router 520 in CCN network 500 still fails to cache divided pieces of data.

As a result, interest packets are transferred to reach transmission terminal 400, and a data packet storing a divided piece of data is returned from transmission terminal 400.

In this way, if transmission terminal 400 is the proximate CCN node, the proximity round trip time RTTn coincides with the ordinary round trip time RTTs. The proximity loss event rate Pn coincides with the ordinary loss event rate Ps.

That is, if transmission terminal 400 is the proximate CCN node, the number of interest packets issued by reception terminal 200 per unit time coincides with the number of data packets received per unit time that can be calculated from an estimated band calculated from TFRC in the upper layer.

Reception terminal 200 notifies transmission terminal 400 of an ordinary band estimation value Xcals. Transmission terminal 400 performs encoding and transmission based on a target bit rate corresponding to the ordinary band estimation value Xcals. Thus, transmission terminal 400 controls the rate based on TFRC. That is, TCP fairness is guaranteed by TFRC in the upper layer.

A case where second reception terminal $200_2$ starts catch-up reproduction of video data will be considered. To catch up real-time streaming transmission performed between transmission terminal 400 and first reception terminal $200_1$, second reception terminal $200_2$ acquires and reproduces video data at a speed higher than an original speed. That is, second reception terminal $200_2$ reproduces the video data by fast-forwarding the video data or skipping pictures.

Instruction by receiving-side speech communication control application 203 to video decoder 207 allows such fast forward reproduction.

Acquisition of Divided Pieces of Data in Lower Layer

A description will be given of how divided pieces of data are acquired in the lower layer.

A proximate CCN node for second reception terminal $200_2$ is first CCN router $510_1$. The reason is that video data has been already transmitted between transmission terminal 400 and first reception terminal $200_1$, and a data packet of the video data is cached in first CCN router $510_1$.

NPL 3 discloses operation in which a life time of cache is limited to a round trip time RTT between terminals. In the present application, a life time of cache is used as a session time. That is, from start to end of a call, a data packet is maintained in first CCN router $510_1$.

In this way, second reception terminal $200_2$ can acquire, from first CCN router $510_1$, video data having been transmitted between transmission terminal 400 and first reception terminal $200_1$ before participation by second reception terminal $200_2$.

Here, in second reception terminal $200_2$, a proximity round trip time RTTn is smaller than an ordinary round trip time RTTs.

A proximity round trip time RTTn smaller than an ordinary round trip time RTTs may cause packet loss at time intervals longer than the ordinary round trip time RTTs. This can be seen often in a case, for example, where band estimation is normally operated. In such a case, a proximate band estimation value Xcaln is larger than an ordinary band estimation value Xcals. This is obvious from a fact that a denominator in Equation 1 has a term of a round trip time RTT.

That is, second reception terminal $200_2$ can use a band larger than a band used by transmission terminal 400 for transmission of video data to acquire the video data. Also in such a case, in second reception terminal $200_2$, a transmission amount of proximity CCN node 510 is adjusted based on TFRC so that an amount of issued interest packets is adjusted. Thus, TCP fairness is satisfied.

In this way, second reception terminal $200_2$ can acquire video data from the beginning from first CCN router $510_1$ so that catch-up reproduction of the video data can be performed.

At this time, transmission terminal 400 receives feedback of the ordinary band estimation values Xcals in RTCP packets from both first reception terminal $200_1$ and second reception terminal $200_2$. Transmission terminal 400 may control a video encoder by using the smaller ordinary band estimation value Xcals of the two, or may ignore the later ordinary band estimation value Xcals from second reception terminal $200_2$.

Transmission terminal 400 may determine which ordinary band estimation value Xcals is to be ignored by comparing the aforementioned respective pieces of additional information among reception terminals 200, which are added to RTCP packets and returned from respective reception terminals 200.

For example, transmission terminal 400 compares a difference between a time indicated by a serial number of currently reproduced data and a time indicated by a serial number of currently encoded data with a round trip time RTT between transmission terminal 400 and a transmitter of a RTCP packet. If the difference between the times is larger than the round trip time RTT, transmission terminal 400 ignores the ordinary band estimation value Xcals from second reception terminal $200_2$.

In contrast, if the difference between the times is equal to or smaller than the round trip time RTT, transmission terminal 400 determines that a reproduction timing of second reception terminal $200_2$ has caught up an original reproduction timing (transmission timing). Transmission terminal 400 includes the ordinary band estimation value Xcals of second reception terminal $200_2$ in targets of the aforementioned minimum value determination.

At a time point when the reproduction timing of second reception terminal $200_2$ catches up the original reproduction timing, the proximate CCN node for second reception terminal $200_2$ becomes transmission terminal 400.

Second reception terminal $200_2$ can detect that transmission terminal 400 becomes the proximate CCN node, for example, by determining whether a proximity round trip time RTTn coincides with an ordinary round trip time RTTs. Thus, second reception terminal $200_2$ may notify transmission terminal 400 of an event that transmission terminal 400 becomes the proximate CCN node. This notification may be a trigger for transmission terminal 400 to include the ordinary band estimation value Xcals included in the feedback from second reception terminal $200_2$ in targets to be searched for a minimum value.

Congestion between second reception terminal $200_2$ and first CCN router $510_1$ prevents the proximate band estimation value Xcaln from increasing, and thus, a reproduction speed cannot be increased. In such a case, second reception terminal $200_2$ can acquire video data in a skipping manner, as described above.

When second reception terminal $200_2$ acquires two streams, i.e., a stream of video data and a stream of voice data, instruction may be made on second reception terminal $200_2$ to acquire all pieces of the voice data without thinning out any pieces and acquire the video data by thinning out some pieces thereof. Accordingly, while satisfying TCP fairness in a network line between second reception terminal $200_2$ and first CCN router $510_1$, second reception terminal $200_2$ can acquire necessary data.

Description of Variation 1

The following describes that reception terminal 200 can measure a proximity round trip time RTTn even in a case where a proximate CCN node changes during catch-up reproduction of video data.

Figure 13:
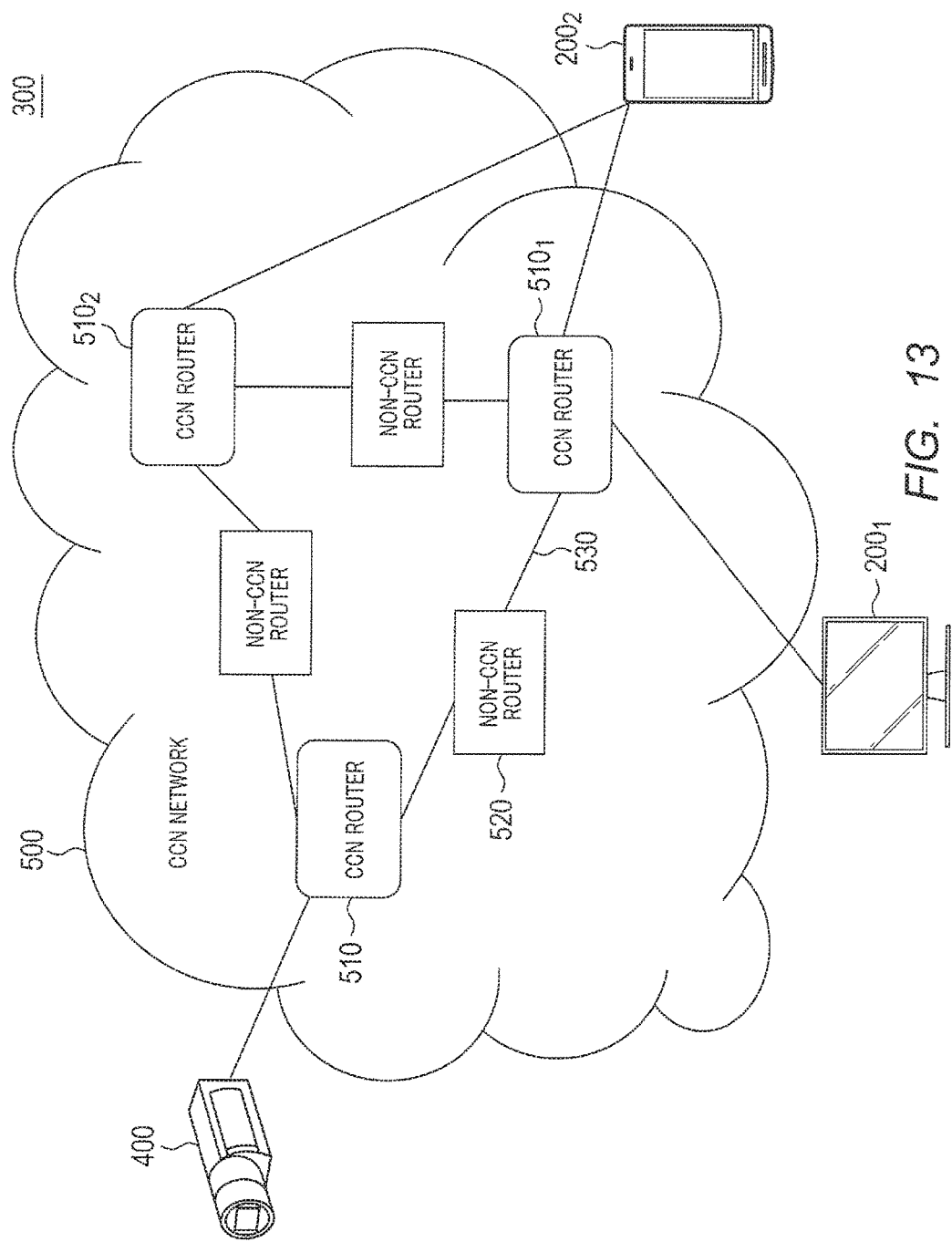
FIG. 13 is a system configuration diagram illustrating a first example of another configuration of the communication system according to Embodiment 2 of the present invention.

FIG. 13 is a system configuration diagram as a first example of another configuration of the communication system. FIG. 13 corresponds to FIG. 3. Same parts as those in FIG. 3 are denoted by same references, and description thereof is omitted.

In FIG. 13, second reception terminal $200_2$ may include, for example, two network connection interfaces ("faces" as a term of CCN). As illustrated in FIG. 13, second reception terminal $200_2$ is connected not only to first CCN router $510_1$ but also to second CCN router $510_2$.

The face of second reception terminal $200_2$ may be, for example, an interface of wireless LAN or public wireless interface such as LTE/WIMAX. Thus, for example, first CCN router $510_1$ is a router of a base station of wireless LAN, while second CCN router $510_2$ is a router in a WIMAX network.

A case where a data packet of a real-time stream to be acquired by second reception terminal $200_2$ has been already cached in both first CCN router $510_1$ and second CCN router $510_2$ is considered. In the case to be considered, a round trip time RTT between second reception terminal $200_2$ and first CCN router $510_1$ is shorter than a round trip time RTT between second reception terminal $200_2$ and second CCN router $510_2$.

Figure 14:
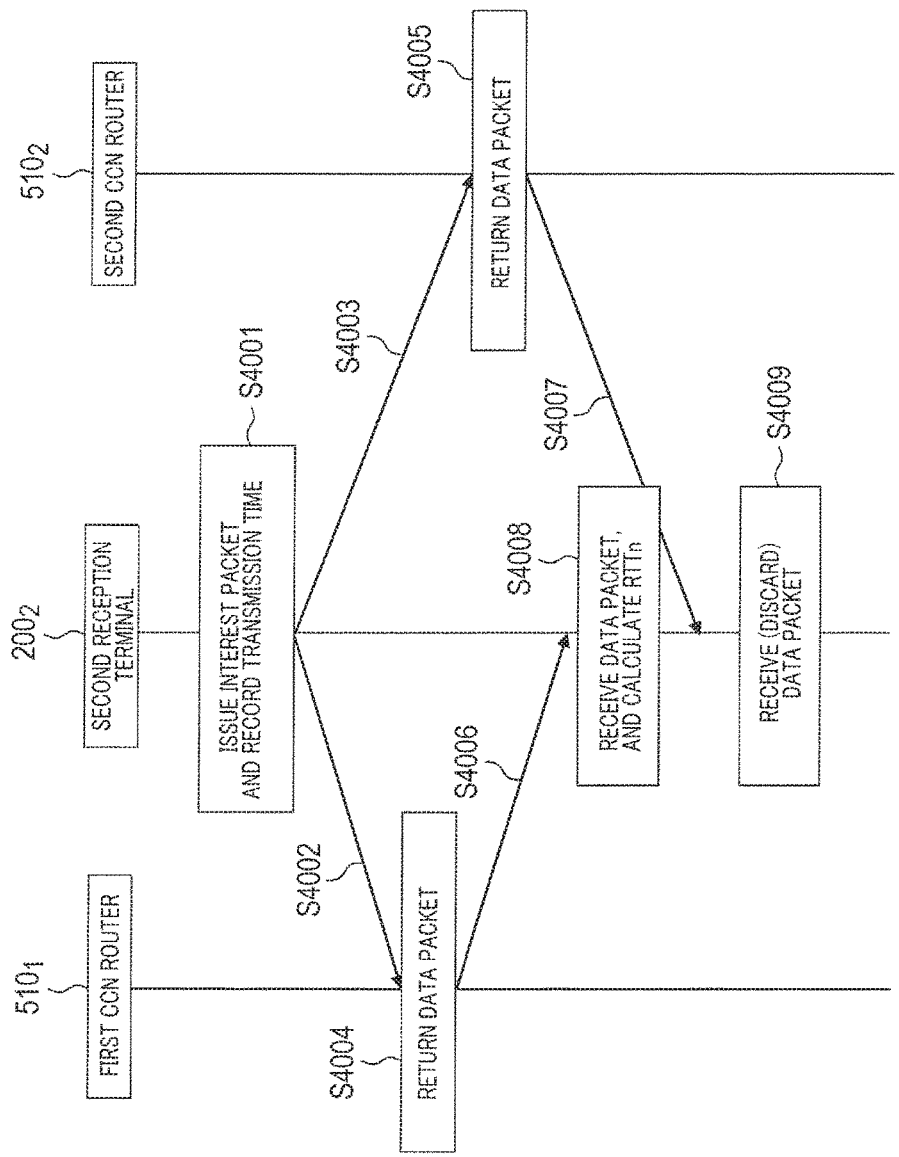
FIG. 14 is a schematic diagram illustrating how a proximate round-trip time RTTn is measured in Embodiment 2 of the present invention.

FIG. 14 is a schematic diagram of measurement of a proximity round-trip time RTTn of the example in FIG. 13, that is, a case where two proximate CCN nodes hold a content.

As described in NPL 1, in CCN, a CCN node issuing an interest packet issues interest packets simultaneously from all faces. Thus, second reception terminal $200_2$ issues interest packets to respective faces. At that time, second reception terminal $200_2$ records information to specify the interest packet (e.g., a name or part of a name such as a serial number) and a transmission time of the interest packet (S4001). An interest packet issued from each face is transmitted to both first CCN router $510_1$ and second CCN router $510_2$ (S4002, S4003).

In this example, both first CCN router $510_1$ and second CCN router $510_2$ cache data packets. Thus, first CCN router $510_1$ and second CCN router $510_2$ each return the data packets to second reception terminal $200_2$ (S4004, S4005).

In this example, however, a data packet returned from first CCN router $510_1$ reaches second reception terminal $200_2$ before a data packet returned from second CCN router $510_2$ reaches second reception terminal $200_2$ (S4006, S4007). Second reception terminal $200_2$ calculates a proximity round trip time RTTn from a difference between the transmission time of the interest packet and the reception time of the earlier received data packet from first CCN router $510_1$ (S4008). Second reception terminal $200_2$ may manage the calculated proximity round trip time RTTn in an internal memory such that the calculated proximity round trip time RTTn accompanies with the data packet, or such that the calculated proximity round trip time RTTn is associated with a name space to issue the interest packet.

Second reception terminal $200_2$ discards the later arriving data packet from second CCN router $510_2$ of data packets that arrive in a duplicated manner (S4009).

In such operation, respective reception terminals 200 can measure a proximity round trip time RTTn that is a round trip time RTT between reception terminal 200 and the proximate CCN node, even when each of the reception terminals 200 is connected to a plurality of CCN routers 510.

Thus, even in the case where a proximate CCN node changes during catch-up reproduction of video data, reception terminal 200 can measure a proximity round trip time RTTn.

For example, during catch-up reproduction, the number of issued interest packets per unit time is larger than the number of issued data packets from transmission terminal 400 per unit time. During issue of an interest packet corresponding to a past data packet, the data packet is cached in CCN router 510. Accordingly, a proximate CCN node becomes the CCN router 510. The proximity round trip time RTTn decreases.

In contrast, when reproduction catches up a real-time transmission, no data packet is cached in CCN router 510. Thus, the proximate CCN node becomes transmission terminal 400. The interest packet is transferred to transmission terminal 400. The proximity round trip time RTTn increases (coincides with the ordinary band estimation value Xcals). Change of the proximate CCN node can be easily detected by observation of an IP address of the transmitter of the data packet.

Description of Variation 2

Next, descriptions will be given of flow rate control of communication system 300 with TCP fairness satisfied even in congestion.

Figure 15:
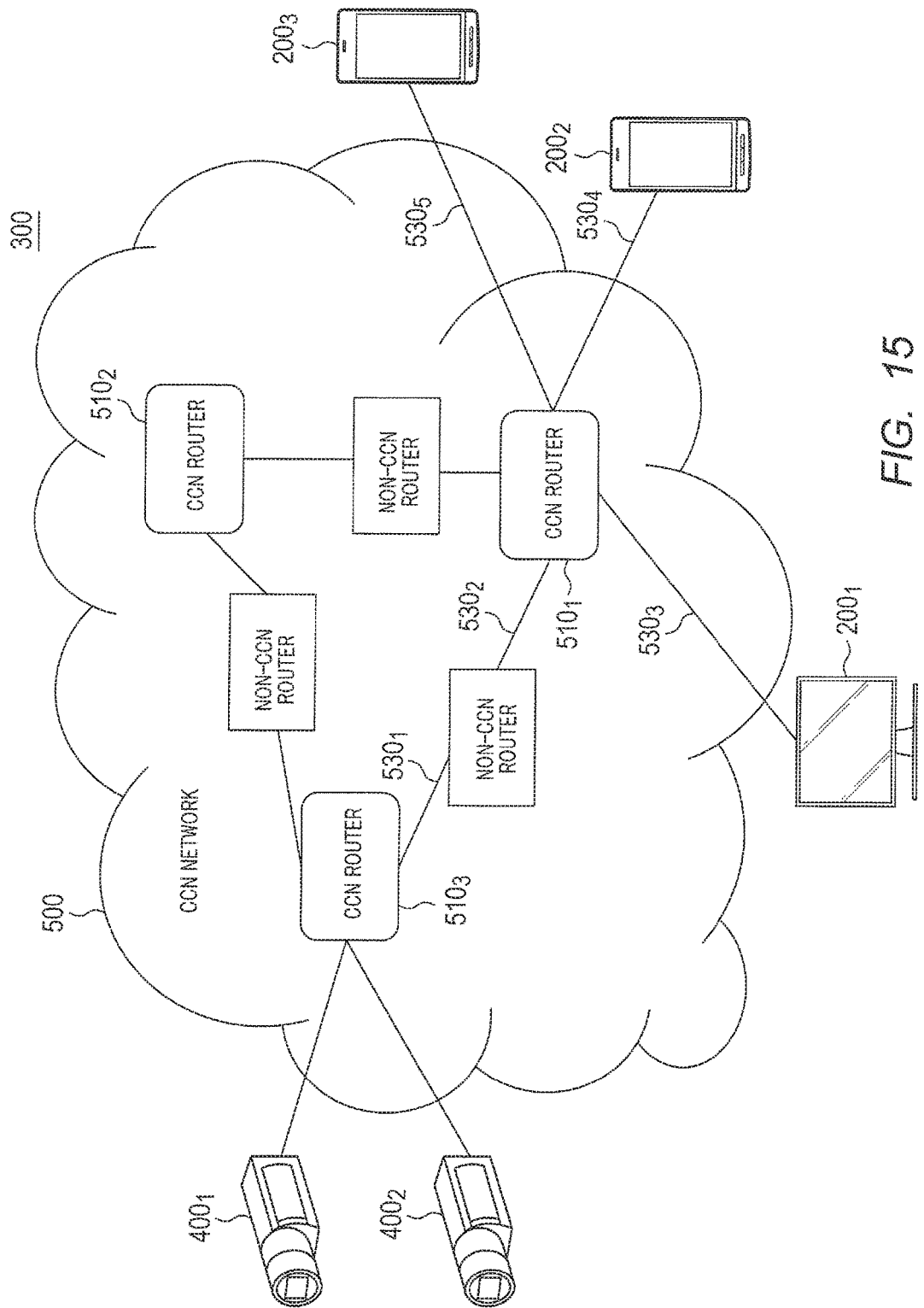
FIG. 15 is a system configuration diagram illustrating a second example of another configuration of the communication system according to Embodiment 2 of the present invention.

FIG. 15 is a system configuration diagram as a second example of the other configuration of the communication system. FIG. 15 corresponds to FIG. 3. Same parts as those in FIG. 3 are denoted by same references, and description thereof is omitted.

As illustrated in FIG. 15, a case where first to third reception terminals $200_1$ to $200_3$ are connected to first CCN router $510_1$ is considered. Further, a case where first and second transmission terminals $400_1$ and $400_2$ are connected to third CCN router $510_3$ is considered.

Third CCN router $510_3$ is connected to first CCN router $510_1$ via first network line $530_1$ and second network line $530_2$. First reception terminal $200_1$ is connected to first CCN router $510_1$ via third network line $530_3$. Second reception terminal $200_2$ is connected to first CCN router $510_1$ via fourth network line $530_4$. Third reception terminal $200_3$ is connected to first CCN router 510₁ via fifth network line 530₅. It is assumed that first to fifth network lines 530₁ to 530₅ each have a band of 2 Mbps.

First transmission terminal 400₁ may perform call communication between first transmission terminal 400₁ and first and second reception terminals 200₁ and 200₂. The communication is referred to as "first communication." Second transmission terminal 400₂ may perform new call communication between second transmission terminal 400₂ and third reception terminals 200₃ during the first communication. The communication is referred to as "second communication."

The first communication and the second communication share first and second network lines 530₁ and 530₂. During only the first communication when the second communication has not started, first transmission terminal 400₁ makes almost the complete use of 2 Mbps of the line band to perform the communication.

However, after start of the second communication, packet loss is temporarily observed in both the first communication and the second communication. At that time, in first and second reception terminals 200₁ and 200₂ for the first communication, increase in ordinary loss event rate Ps is observed. The ordinary band estimation value Xcals is calculated as a small value. The value is fed back to first transmission terminal 400₁ to reduce an encoding rate (transmission rate) in the first communication.

Third reception terminal 200₃ performing the second communication calculates the ordinary band estimation value Xcals as a small value, similarly. The value is fed back to second transmission terminal 400₂ to reduce an encoding rate (transmission rate) in the second communication.

That is, the first communication and the second communication can share first and second network lines 530₁ and 530₂, appropriately. In the above description, two streams controlled by TFRC compete with each other. The same applies to a case where competitions occur in multiple communications including a communication controlled by TCP.

In this way, communication system 300 has a function to share a band of TFRC and allows flow rate control with satisfying TCP fairness even in congestion.

As described above, in communication system 300 of the present embodiment, an available band between reception terminal 200 and a proximate CCN node is estimated, and a flow rate control is performed such that the proximate CCN node transfers data using the estimated band. Further, in communication system 300 of the present embodiment, an available band is estimated, and a flow rate control is performed such that transmission terminal 400 transmits data using the estimated band. That is, in communication system 300 of the present embodiment, while preventing TFRC-based band estimation in the upper layer to achieve TCP fairness from being hindered, the number of issued CCN interest packets per unit time is adjusted.

Thus, in communication system 300 of the present embodiment, transmission of a real-time stream can be continued while the band estimation (TFRC) in the upper layer is not affected by the flow rate control (CCN) in the lower layer to maintain TCP fairness by TFRC. That is, in communication system 300 of the present embodiment, CCN is applied to a best effort network such as the Internet, and a flow rate of a real-time stream such as video and voice can be appropriately controlled with preventing packet loss.

In communication system 300 of the present embodiment, when another reception terminal 200 acquires a real-time stream from the cached on CCN router 510, a flow rate can be controlled in accordance with a degree of congestion in the network between the other reception terminal 200 and CCN router 510. That is, in communication system 300 of the present embodiment, an appropriate flow rate control can be performed even in a use case where another reception terminal joins a transmission session in the middle of or after the transmission of a real-time stream of video and voice.

In the aforementioned embodiments, a case where a real-time stream to be acquired by the reception terminal is video data is exemplified. However, such real-time stream is not limited thereto. The present invention can be also applied to, for example, voice data transmitted and received interactively in a teleconference.

Also, a case where TFRC is used for band estimation in the upper layer is exemplified. However, a method for the band estimation in the upper layer is not limited thereto. The present invention can be also applied, for example, to another method for band estimation derived from TFRC, or to another method for band estimation such as BCC (binominal congestion control).

The communication system disclosed herein includes a transmission terminal that transmits a packet in a real-time stream, a transfer terminal that transfers the packet, and a reception terminal that receives the packet, in which the transfer terminal includes: a cache section that caches the packet transmitted from the transmission terminal; and a transfer stack that transfers the packet cached in the cache section to the reception terminal in response to a request from the reception terminal, and the reception terminal includes: an available band estimating section that estimates a first available band that is an available band between the reception terminal and the transfer terminal, and a second available band that is an available band between the reception terminal and the transmission terminal; and an RTCP-R control section that requests the transfer terminal to transfer the packet using the estimated first available band and that notifies the transmission terminal of the estimated second available band, and the transmission terminal includes a transmission stack that transmits the packet using the second available band notified by the reception terminal.

In the communication system, each of the transmission terminal, the transfer terminal and the reception terminal may be a CCN-compliant terminal; and the request may be made by transmission of an interest packet that is a packet requesting return of the real-time stream by specifying a name of the real-time stream.

The reception terminal disclosed herein is a reception terminal in a communication system including a transmission terminal that transmits a packet in a real-time stream, a transfer terminal that caches and transfers the packet transmitted from the transmission terminal, and a reception terminal that receives the packet transferred from the transfer terminal, the reception terminal including: an available band estimating section that estimates a first available band that is an available band between the reception terminal and the transfer terminal, and a second available band that is an available band between the reception terminal and the transmission terminal; and an RTCP-R control section that requests the transfer terminal to transfer the packet at a frequency based on the estimated first available band to cause the transfer terminal to transfer the packet using the first available band, and that notifies the transmission terminal of the estimated second available band to cause the transmission terminal to transmit the packet using the second available band.

In the reception terminal, each of the transmission terminal, the transfer terminal and the reception terminal may be a CCN-compliant terminal; and the request may be made by transmission of an interest packet that is a packet requesting return of the real-time stream by specifying a name of the real-time stream.

The reception terminal may further include: a reception stack that performs communication including reception of the packet between the reception terminal and the transfer terminal; and an RTT-R conversion section that calculates a first loss event rate which is a loss event rate between the reception terminal and the transfer terminal, and a first RTT which is an RTT between the reception terminal and the transfer terminal from the communication between the reception terminal and the transfer terminal by the reception stack, in which the available band estimating section may calculate a second loss event rate which is a loss event rate between the reception terminal and the transmission terminal, and a second RTT which is an RTT between the reception terminal and the transmission terminal from the packet received by the reception stack, estimates the first available band from the calculated first loss event rate and the calculated first RTT, and estimates the second available band from the calculated second loss event rate and the calculated second RTT, and the RTCP-R control section may instruct the reception stack to transmit the interest packet to the transfer terminal at the frequency based on the estimated first available band.

In the reception terminal, the RTT-R conversion section may extract data of the real-time stream from the packet received by the reception stack, wherein the reception terminal may further include a real-time stream reproduction section (video decoder) that reproduces the real-time stream from the extracted data, and the RTCP-R control section may determine whether or not the second available band is larger than a second actually used band that is a band used by the transmission terminal to transmit the packet, and the RTCP-R control section may allow the real-time stream reproduction section to reproduce the real-time stream at a higher speed than an original reproduction speed on condition that the second available band is larger than the second actually used band.

The reception terminal may further include a real-time stream reproduction section (video decoder) that reproduces the real-time stream from the packet received by the reception stack, in which the RTCP-R control section may determine whether or not the second available band is smaller than a second actually used band that is a band used by the transmission terminal to transmit the packet, and the RTCP-R control section may instruct the reception stack to request a series of the packets constituting the real-time stream by thinning out some of the packets, on condition that the second available band is smaller than the second actually used band.

The transmission terminal according to an aspect of the present invention is a transmission terminal in a communication system including a transmission terminal that transmits a packet in a real-time stream, a transfer terminal that caches and transfers the packet transmitted from the transmission terminal, and a reception terminal that receives the packet transferred from the transfer terminal, the transmission terminal including: a transmission stack that transmits the packet storing data of the real-time stream; an RTCP-S control section that receives a notification from the reception terminal that estimates a first available band that is an available band between the reception terminal and the transfer terminal and a second available band that is an available band between the reception terminal and the transmission terminal and requests the transfer terminal to transfer the packet at a frequency based on the estimated first available band to cause the transfer terminal to transfer the packet using the first available band, the notification being of the second available band; and a transmission band estimating section that causes the transmission stack to transmit the packet using the second available band notified by the reception terminal.

The flow rate control method disclosed herein is a flow rate control method in a communication system including a transmission terminal that transmits a packet in a real-time stream, a transfer terminal that caches and transfers the packet transmitted from the transmission terminal, and a reception terminal that receives the packet transferred from the transfer terminal, the flow rate control method including: estimating, by the reception terminal, a first available band that is an available band between the reception terminal and the transfer terminal and a second available band that is an available band between the reception terminal and the transmission terminal; and requesting, by the reception terminal, the transfer terminal to transfer the packet at a frequency based on the estimated first available band to cause the transfer terminal to transfer the packet using the first available band, and notifying, by the reception terminal, the transmission terminal of the estimated second available band to cause the transmission terminal to transmit the packet using the second available band.

The disclosure of Japanese Patent Application No. 2012-234682, filed on Oct. 24, 2012, including the specification, drawings and abstract is incorporated herein by reference in its entirety.

INDUSTRIAL APPLICABILITY

The present invention is suitable for use in a communication system, a reception terminal, a transmission terminal and a flow rate control method, in which when CCN is applied to a best effort network to transmit a real-time streaming packet, decrease in transmission performance can be prevented.

REFERENCE SIGNS LIST

200 Reception terminal
201 CCN receiving stack
202 Receiving-side call control conversion section
203 Receiving-side speech communication control application
204 RTP-R conversion section
205 Available band estimating section
206 RTCP-R control section
207 Video decoder
300 Communication system
400 Transmission terminal
401 CCN transmission stack
402 Transmitting-side call control conversion section
403 Transmitting-side speech communication control application
404 Video encoder
405 RTP-S conversion section
406 RTCP-S control section
407 Transmission band estimating section
500 CCN network
510 CCN router
511 Cache section
512 CCN transfer stack
520 Non-CCN router
530 Network line

The invention claimed is:

1. A reception terminal in a communication system, the communication system comprising a transmission terminal that transmits packets in a real-time stream and a transfer terminal that caches and transfers packets transmitted from the transmission terminal, the reception terminal comprising:
- a receiver, which, in operation, receives packets transmitted from the transmission terminal and packets transferred from the transfer terminal;
- circuitry, coupled to the receiver and which, in operation, obtains a first available band that is an available band between the reception terminal and the transfer terminal, and a second available band that is an available band between the reception terminal and the transmission terminal; and
- a transmitter, coupled to the circuitry and which, in operation,
    - transmits requests to the transfer terminal at a frequency that is based on the first available band, wherein the frequency defines how often the requests are transmitted and the requests trigger transmission of packets from the transfer terminal to the reception terminal in the first available band, and
    - notifies the transmission terminal of the second available band to trigger transmission of packets from the transmission terminal to the reception terminal in the second available band.

2. The reception terminal according to claim 1, which is a CCN (content centric network)-compliant terminal, wherein the requests are interest packets each requesting return of a real-time stream by specifying a name of the real-time stream.

3. The reception terminal according to claim 2, wherein the circuitry, in operation, calculates a first loss event rate which is a loss event rate between the reception terminal and the transfer terminal, a first round trip time (RTT) which is an RTT between the reception terminal and the transfer terminal, a second loss event rate which is a loss event rate between the reception terminal and the transmission terminal, and a second RTT which is an RTT between the reception terminal and the transmission terminal, estimates the first available band from the first loss event rate and the first RTT, and estimates the second available band from the second loss event rate and the second RTT.

4. The reception terminal according to claim 3, wherein the circuitry, in operation, extracts data from the received packets, reproduces the real-time stream from the extracted data, determines whether or not the second available band is larger than a second actually-used band that is a band used by the transmission terminal to transmit the packets, and reproduces the real-time stream at a higher speed than an original reproduction speed when the second available band is larger than the second actually-used band.

5. The reception terminal according to claim 4, comprising a video decoder which, in operation, reproduces the real-time stream, wherein the circuitry, in operation, determines whether or not the second available band is smaller than the second actually-used band and instructs the transmitter to transmit the requests less frequently when the second available band is smaller than the second actually-used band.

6. A flow rate control method performed by a reception terminal in a communication system, the communication system comprising a transmission terminal that transmits packets in a real-time stream and a transfer terminal that caches and transfers packets transmitted from the transmission terminal, the method comprising:
- obtaining a first available band that is an available band between the reception terminal and the transfer terminal and a second available band that is an available band between the reception terminal and the transmission terminal;
- transmitting, to the transfer terminal, requests at a frequency that is based on the first available band, wherein the frequency defines how often the requests are transmitted and the requests trigger transmission of packets from the transfer terminal to the reception terminal in the first available band;
- notifying the transmission terminal of the second available band to trigger transmission of packets from the transmission terminal to the reception terminal in the second available band; and
- receiving packets transmitted from the transmission terminal and packets transferred from the transfer terminal.

7. The method according to claim 6, wherein the reception terminal is a CCN (content centric network)-compliant terminal and the requests are interest packets each requesting return of a real-time stream by specifying a name of the real-time stream.

8. The method according to claim 7, comprising:
- calculating a first loss event rate which is a loss event rate between the reception terminal and the transfer terminal, a first round trip time (RTT) which is an RTT between the reception terminal and the transfer terminal, a second loss event rate which is a loss event rate between the reception terminal and the transmission terminal, and a second RTT which is an RTT between the reception terminal and the transmission terminal; and
- estimating the first available band from the first loss event rate and the first RTT, and the second available band from the second loss event rate and the second RTT.

9. The method according to claim 8, comprising:
- extracting data from the received packets;
- reproducing the real-time stream from the extracted data; and
- determining whether or not the second available band is larger than a second actually-used band that is a band used by the transmission terminal to transmit the packets, and reproducing the real-time stream at a higher speed than an original reproduction speed when the second available band is larger than the second actually-used band.

10. The method according to claim 9, comprising:
- determining whether or not the second available band is smaller than the second actually-used band and transmitting the requests less frequently when the second available band is smaller than the second actually-used band.

* * * * *